United States Patent
Olson et al.

(10) Patent No.: US 9,459,869 B2
(45) Date of Patent: Oct. 4, 2016

(54) INTELLIGENT CACHING FOR AN OPERAND CACHE

(71) Applicant: Apple Inc., Cupertino, CA (US)

(72) Inventors: Timothy A. Olson, Austin, TX (US);
Terence M. Potter, Austin, TX (US);
James S. Blomgren, Austin, TX (US);
Andrew M. Havlir, Austin, TX (US)

(73) Assignee: Apple Inc., Cupertino, CA (US)

( * ) Notice: Subject to any disclaimer, the term of this patent is extended or adjusted under 35 U.S.C. 154(b) by 445 days.

(21) Appl. No.: 13/971,800

(22) Filed: Aug. 20, 2013

(65) Prior Publication Data
US 2015/0058572 A1   Feb. 26, 2015

(51) Int. Cl.
| G06F 12/00 | (2006.01) |
| G06F 13/00 | (2006.01) |
| G06F 13/28 | (2006.01) |
| G06F 9/30 | (2006.01) |
| G06F 9/38 | (2006.01) |
| G06T 1/20 | (2006.01) |
| G06F 12/08 | (2016.01) |

(52) U.S. Cl.
CPC ............ G06F 9/30043 (2013.01); G06F 9/38 (2013.01); G06T 1/20 (2013.01); G06F 12/0862 (2013.01); G06F 12/0875 (2013.01); G06F 2212/452 (2013.01); Y02B 60/1225 (2013.01)

(58) Field of Classification Search
CPC ........................ G06F 12/0862; G06F 12/0875; G06F 2212/452; G06F 9/30043; G06F 9/38
USPC ........................................................ 711/125
See application file for complete search history.

(56) References Cited

U.S. PATENT DOCUMENTS

| 3,626,427 A | * | 12/1971 | MacSorley | G06F 15/78 712/228 |
| 5,481,734 A | * | 1/1996 | Yoshida | G06F 9/30036 710/307 |
| 5,764,943 A | * | 6/1998 | Wechsler | G06F 9/3836 712/200 |
| 5,919,256 A | * | 7/1999 | Widigen | G06F 9/383 711/100 |
| 5,958,045 A | * | 9/1999 | Pickett | G06F 9/30043 711/118 |
| 6,055,621 A | * | 4/2000 | Puzak | G06F 9/3802 712/207 |
| 6,092,184 A | * | 7/2000 | Wechsler | G06F 9/3838 712/215 |

(Continued)

FOREIGN PATENT DOCUMENTS

| EP | 0717359 | 6/1996 |
| TW | 201015318 | 4/2010 |
| WO | 9003001 | 3/1990 |

*Primary Examiner* — Sheng-Jen Tsai
(74) *Attorney, Agent, or Firm* — Meyertons, Hood, Kivlin, Kowert & Goetzel, P.C.

(57) ABSTRACT

Instructions may require one or more operands to be executed, which may be provided from a register file. In the context of a GPU, however, a register file may be a relatively large structure, and reading from the register file may be energy and/or time intensive An operand cache may store a subset of operands, and may use less power and have quicker access times than the register file. In some embodiments, intelligent operand prefetching may speed execution by reducing memory bank conflicts (e.g., conflicts within a register file containing multiple memory banks). An unused operand slot for another instruction (e.g., an instruction that does not require a maximum number of source operands allowed by an instruction set architecture) may be used to prefetch an operand for another instruction in one embodiment. Prefetched operands may be stored in an operand cache, and prefetching may occur based on software-provided information.

19 Claims, 13 Drawing Sheets

(56) References Cited

U.S. PATENT DOCUMENTS

| | | | |
|---|---|---|---|
| 6,289,417 B1 | 9/2001 | Larri | |
| 6,560,693 B1* | 5/2003 | Puzak | G06F 9/383 |
| | | | 712/205 |
| 6,754,809 B1* | 6/2004 | Guttag | G06F 9/3004 |
| | | | 712/225 |
| 6,757,809 B1* | 6/2004 | Yoshida | G06F 9/30036 |
| | | | 710/307 |
| 6,865,645 B1* | 3/2005 | Shum | G06F 9/3812 |
| | | | 711/123 |
| 8,289,335 B2* | 10/2012 | Hansen | G06F 9/30018 |
| | | | 345/522 |
| 9,183,611 B2* | 11/2015 | Havlir | G06T 1/20 |
| 2001/0011342 A1* | 8/2001 | Pechanek | G06F 9/30036 |
| | | | 712/16 |
| 2001/0056456 A1* | 12/2001 | Cota-Robles | G06F 9/4843 |
| | | | 718/103 |
| 2004/0064680 A1* | 4/2004 | Kadambi | G06F 9/30138 |
| | | | 712/218 |
| 2005/0138297 A1* | 6/2005 | Sodani | G06F 9/30138 |
| | | | 711/143 |
| 2005/0289299 A1 | 12/2005 | Nunamaker et al. | |
| 2007/0239970 A1* | 10/2007 | Liao | G06F 9/3012 |
| | | | 712/225 |
| 2007/0294482 A1* | 12/2007 | Kadambi | G06F 12/0862 |
| | | | 711/137 |
| 2008/0022044 A1 | 1/2008 | Nunamaker et al. | |
| 2011/0078414 A1* | 3/2011 | Olson | G06F 9/3012 |
| | | | 712/208 |
| 2011/0161593 A1 | 6/2011 | Yamazaki | |
| 2012/0047329 A1 | 2/2012 | Goel et al. | |
| 2012/0110269 A1* | 5/2012 | Frank | G06F 9/30047 |
| | | | 711/137 |
| 2013/0086364 A1 | 4/2013 | Gschwind et al. | |
| 2013/0159628 A1 | 6/2013 | Choquette et al. | |
| 2013/0246708 A1* | 9/2013 | Ono | G06F 12/0862 |
| | | | 711/122 |
| 2015/0058571 A1* | 2/2015 | Potter | G06F 9/30043 |
| | | | 711/125 |
| 2015/0058573 A1* | 2/2015 | Blomgren | G06F 9/30043 |
| | | | 711/125 |

* cited by examiner

300 ↘

Operand Cache 315

| | Operand Value 320 | Valid 322 | Tag Value 324 | Last Use 326 |
|---|---|---|---|---|
| 0 | 320A | 322A | 324A | 326A |
| 1 | 320B | 322B | 324B | 326B |
| . | . | . | . | . |
| . | . | . | . | . |
| . | . | . | . | . |
| N-1 | | | | |

Entries 317

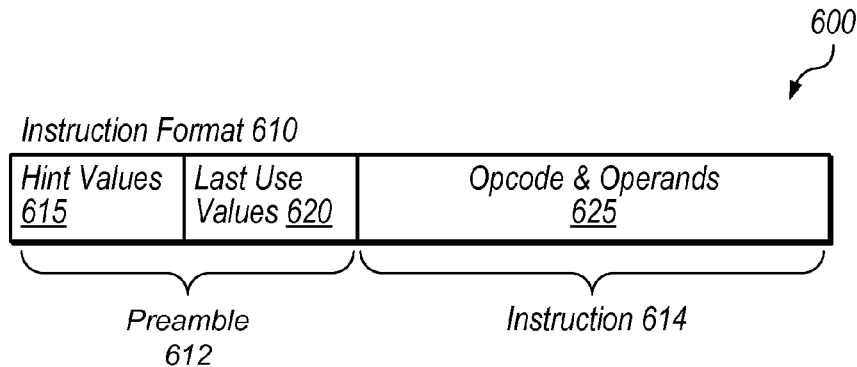

INTELLIGENT CACHING FOR AN OPERAND CACHE

BACKGROUND

Graphics processing units (GPUs) are frequently used to operate on large amounts of data. The execution of GPU instructions may consume considerable power, especially in more powerful GPUs. Excess power consumption may be problematic, particularly in mobile graphics applications in which a battery is used as a power source.

A GPU may also encounter delays or stalls during processing of instructions. For example, when data needed for execution of instructions is not immediately available to an execution unit, there may be a delay associated with retrieving the data before execution can proceed. Avoiding execution delays may therefore improve performance.

SUMMARY

Instructions may require one or more operands in order to be executed. Typically, operands may be provided to an execution unit from a register file. In the context of a traditional graphical processing unit (GPU), however, a register file may be used by multiple different threads, and/or may be a relatively large structure. For example, a GPU register file may have storage space for thousands of operands. As a result, reading from the GPU register file may be energy intensive, and may require a longer access time than accessing a smaller, more convenient structure. Furthermore, implementing a large register file structure (with several read and write ports) may be prohibitively expensive. Thus, to reduce cost a register file may be banked to allow reading and writing of many operands. Bank conflict stalls may still occur, however (e.g., when a compiler is unable to partition operand register addresses to match the banking of the register file).

Accordingly, an operand cache may be used to store a subset of operands (e.g., one or more operands) for instructions that are to be executed. The operand cache may be considerably smaller than a corresponding register file, in one embodiment, and may therefore have quicker access times and use less power than the register file. It may also be relatively inexpensive, in various embodiments, to add multiple read and/or write ports to an operand cache.

In some instances, it may be desirable to "prefetch" one or more operands for an instruction to be executed. For example, prefetching an operand may reduce execution time by eliminating a bank conflict (which can occur, in some embodiments, if two or more different source operands for a same instruction are stored in a memory bank that only allows one operand to be read at a time). In the case of bank conflicts, it may therefore take two or more successive reads to acquire all the operands needed for an instruction.

By prefetching one or more operands before they are needed, however, bank conflicts may be avoided in various embodiments. In one embodiment, prefetching is performed using another instruction that has one or more free operand read slots (i.e., an operand that does not require the maximum allowable number of source instructions). Thus, in one example, if a multiply-add unit is just doing a multiply and does not need its third operand, that operand can be used to prefetch another operand for future use in one embodiment.

Because most instructions don't require all possible source operands, in some embodiments, an idle read port may often be available. Prefetched operands may be stored in an operand cache for later use (e.g., the execution of later instructions). Furthermore, the number of ports (and/or memory banks) in a register file may be reduced, in some embodiments, if one or more sources are made to be only available from an operand cache.

BRIEF DESCRIPTION OF THE DRAWINGS

FIG. 6 is a block diagram of one embodiment of an instruction format including an instruction preamble that may be used to store hint values and last-use values, in some embodiments.

FIGS. 7A, 7B, and 7C are a series of block diagrams depicting an operand cache as it relates to a cache eviction and cache write process.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to denote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112(f) for that unit/circuit/component.

The terms "first," "second," etc., are used herein as labels for nouns that they precede unless otherwise noted, and do not imply any type of ordering (e.g., spatial, temporal, logical, etc.) unless indicated. For example, a "first" operand and a "second" operand can be used to refer to any two operands, and does not imply that one operand occurs before the other. In other words, "first" and "second" are descriptors.

"Based On" or "Based Upon." As used herein, these terms are used to describe one or more factors that affect a determination. This term does not foreclose additional factors that may affect a determination. That is, a determination may be solely based on the factor(s) stated or may be based on one or more factors in addition to the factor(s) stated. Consider the phrase "determining A based on B." While B may be a factor that affects the determination of A, such a phrase does not foreclose the determination of A from also being based on C. In other instances, however, A may be determined based solely on B.

DETAILED DESCRIPTION

Figure 1:
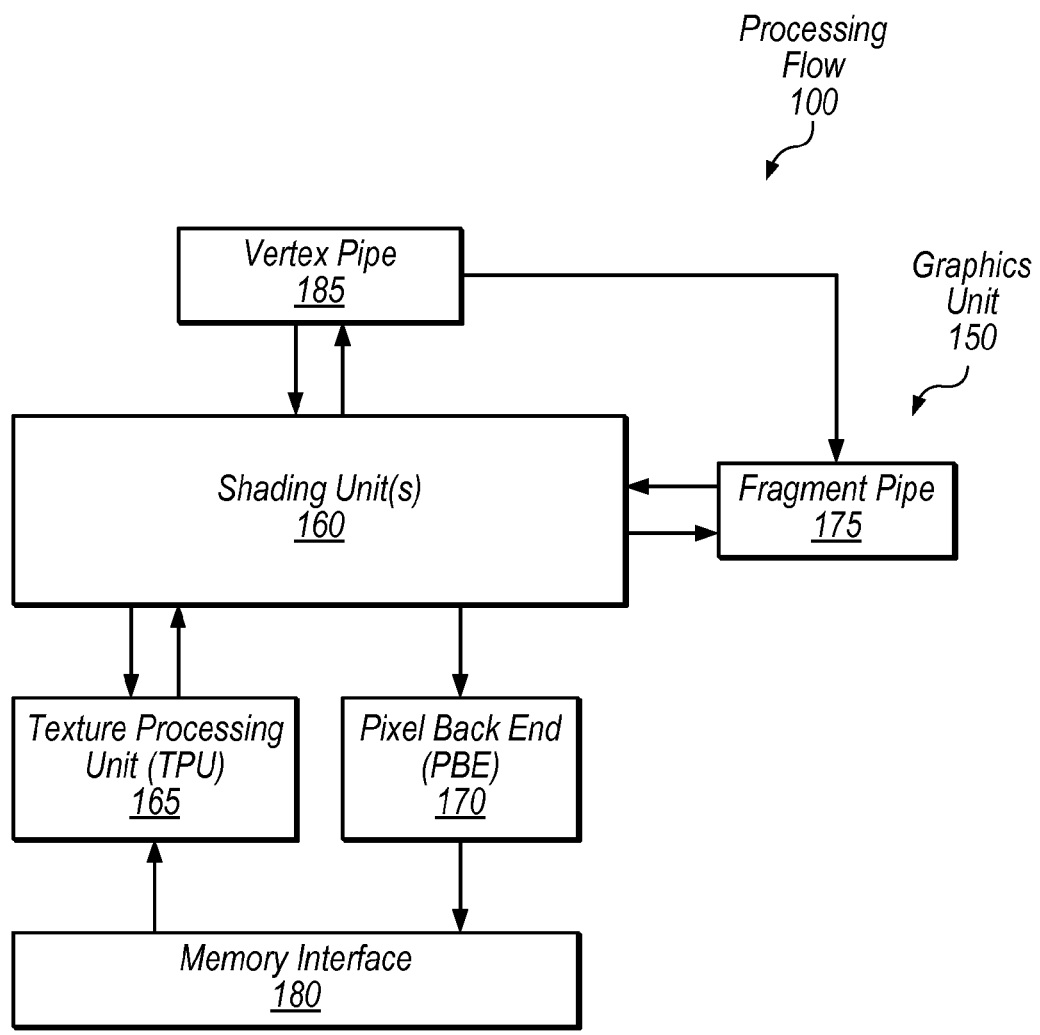
FIG. 1 is a block diagram illustrating one embodiment of a graphics unit.

This disclosure initially describes, with reference to FIG. 1, an overview of a graphics processing flow and an exemplary graphics unit. Additional embodiments relating to operand caches are described in further details in other figures.

Turning now to FIG. 1, a simplified block diagram illustrating one embodiment of a graphics unit 150 is shown. In the illustrated embodiment, graphics unit 150 includes shading unit(s) (SU) 160, vertex pipe 185, fragment pipe 175, texture processing unit (TPU) 165, pixel back end (PBE) 170, and memory interface 180. In one embodiment, graphics unit 150 may be configured to process both vertex and fragment data using SU 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with SU 160 in order to coordinate vertex processing. In the illustrated embodiment, vertex pipe 185 is configured to send processed data to fragment pipe 175 and/or SU 160 for further processing.

Fragment pipe 175, in the illustrated embodiment, may include various fixed-function hardware configured to process pixel data. Fragment pipe 175 may be configured to communicate with SU 160 in order to coordinate fragment processing. Fragment pipe 175 may be configured to perform rasterization on polygons from vertex pipe 185 and/or SU 160 to generate fragment data. Vertex pipe 185 and/or fragment pipe 175 may be coupled to memory interface 180 (coupling not shown) in order to access graphics data.

SU 160, in the illustrated embodiment, is configured to receive vertex data from vertex pipe 185 and fragment data from fragment pipe 175 and/or TPU 165. SU 160 may be configured to perform vertex processing tasks on vertex data which may include various transformations and/or adjustments of vertex data. SU 160, in the illustrated embodiment, is also configured to perform fragment processing tasks on pixel data such as texturing and shading, for example. SU 160 may include multiple execution instances for processing data in parallel. SU 160 may be referred to as "unified" (i.e., unified shading cluster) in the illustrated embodiment in the sense that it is configured to process both vertex and fragment data. In other embodiments, programmable shaders may be configured to process only vertex data or only fragment data.

TPU 165, in the illustrated embodiment, is configured to schedule fragment processing tasks from SU 160. In one embodiment, TPU 165 may be configured to prefetch texture data and assign initial colors to fragments for further processing by SU 160 (e.g., via memory interface 180). TPU 165 may be configured to provide fragment components in normalized integer formats or floating-point formats, for example. In one embodiment, TPU 165 may be configured to provide fragments in groups of four (a "fragment quad") in a 2×2 format to be processed by a group of four execution instances in SU 160.

PBE 170, in the illustrated embodiment, is configured to store processed tiles of an image and may perform final operations to a rendered image before it is transferred to a frame buffer (e.g., in a system memory via memory interface 180). Memory interface 180 may facilitate communications with one or more of various memory hierarchies in various embodiments.

In various embodiments, a programmable shader such as SU 160 may be coupled in any of various appropriate configurations to other programmable and/or fixed-function elements in a graphics unit. Accordingly, the exemplary embodiment of FIG. 1 shows one possible configuration of a graphics unit 150 for illustrative purposes. As discussed further below, operand caches may be used as part of graphics unit 150 in various embodiments.

Figure 2:
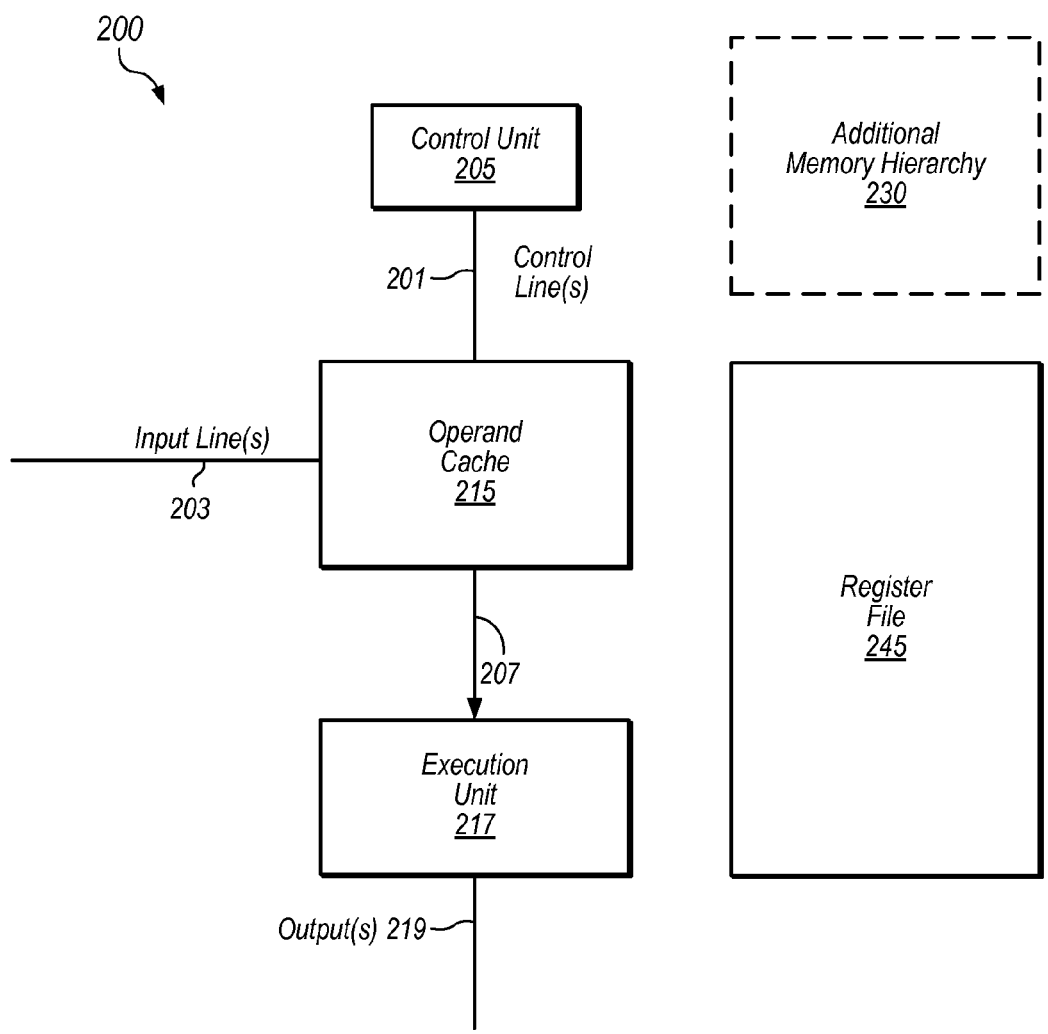
FIG. 2 is a block diagram illustrating one embodiment of an operand cache and associated structures.

Turning now to FIG. 2, a block diagram 200 is shown of one embodiment of an operand cache 215 and associated structures. In some embodiments, one or more structures depicted in FIG. 2 are part of shading unit 160, but may be located in other portions of a system (e.g., GPU, CPU, scalar and/or vector processing units, etc.) in various embodiments.

The system of FIG. 2 includes control unit 205, operand cache 215, execution unit 217, register file 245, and additional memory hierarchy 230. Control unit 205 is coupled to operand cache 215 via one or more control lines 201 in the embodiment shown. Control lines 201 may transmit control information to and/or receive control information from operand cache 215. Thus, control lines 201 may be used to effect control of reading from and/or writing to operand cache 215 in various embodiments. Additional control lines (not shown) may be used to control all or part of other structures (e.g., register file 245, memory hierarchy 230, etc.) in some embodiments.

In one embodiment, register file 245 is configured to store a plurality of operands for instructions to be executed by execution unit 217. Register file 245 may store operands for a large number (e.g., hundreds, thousands) of threads within a GPU in some embodiments. Thus, in the embodiment of FIG. 2, register file 245 may be implemented as a RAM array. Accordingly, in one embodiment, register file 245 is organized as two or more groups of memory banks, where each of the groups includes one or more memory banks that are configured to store operands. Access to register file 245 (e.g., to read an operand from a memory bank) may be slower and power-inefficient, in some embodiments, when compared to other types of structures that are capable of storing operands (e.g., smaller structures that are comprised of flops and/or latches, such as operand cache 215 in some embodiments). Further, as discussed above, bank conflict stalls may occur even in a multi-banked register file, in various embodiments.

Register file 245 may be a single-instruction, multiple data register file (e.g., a wide SIMD structure that is expensive to read from) in some embodiments. For example, reading from register file 245 may require reading 32 total operands in one embodiment. Thus, as described below, operand caching may be even more beneficial when register file 245 is a wide SIMD structure, in at least one embodiment.

In various embodiments, register file 245 may receive various data and/or control information from control unit 205, and operands from memory hierarchy 230. For example, in one embodiment, memory hierarchy 230 may transmit operands to register file 245, while control unit 205 transmits control information (although various configurations are possible, and control information and/or operands may be transmitted by other structures in some embodiments).

In the embodiment of FIG. 2, memory hierarchy 230 includes storage structures that may hold operand data (and/or other data, control information, etc.). Accordingly, in some embodiments, memory hierarchy 230 includes one or more of any or all of the following: L1 cache, L2 cache, L3 cache, additional register files and/or operand caches, storage devices such as flash memory, hard drives, static RAM devices, etc. Memory hierarchy 230 may include operands generated from various functional units (e.g., execution units, memory units, etc.) in different embodiments. In one embodiment, memory hierarchy 230 therefore includes one or more additional register files that are configured to provide operands to one or more additional operand caches and/or one or more additional execution units (not shown). These structures may be arranged in a hierarchy in various embodiments such that a deeper layer in the hierarchy will have more storage capacity, but slower access time. In one embodiment, there are one or more separate register files that are not included in memory hierarchy 230, and that may be used in parallel with register file 245. Furthermore, memory hierarchy 230 is configured to interact with operand cache 215 in the embodiment of FIG. 2.

Operand cache 215 is configured to store one or more operands in the embodiment shown, and may help remedy issues associated with register file 245 (e.g., slow access, high power consumption, bank conflicts) in various embodiments. Operands stored by operand cache 215 may, in various embodiments, be a subset of operands that are stored elsewhere, such as register file 245 and/or additional memory hierarchy 230. Note that as used herein, the term "subset" refers to one or more of something, unless otherwise indicated. Thus, a "subset" of operands indicates one or more operands are being referred to.

In the embodiment shown, operand cache 215 is smaller in size than register file 245 (and is also smaller than various components of memory hierarchy 230). The smaller size of operand cache 215 may also allow operand cache 215 to consume less power than register file 245 when writing and/or reading an operand. Consider one example in which register file 245 is a 4 MB array of RAM, while operand cache 215 has storage for 32 operands. In such a scenario, it may take an appreciably less amount of time and/or power to access the operand cache vs. the register file. In one embodiment, operand cache 215 is configured to store 10% or less of the amount of operands that register file 245 is configured to store (though this percentage is non-limiting and may vary in other embodiments). In general, operand cache 215 may otherwise have one or more of the properties that one of skill in the art would associate with a cache, in various embodiments.

In the embodiment of FIG. 2, operand cache 215 is configured to receive operands via one or more input lines 203. Input lines 203 may be coupled to one or more data sources in various embodiments in order to receive operands. Data sources from which operands may be received on input lines 203 include register file 245, memory hierarchy 230, outputs of execution unit 217, and outputs of other structures (such as a source selection unit) in one or more embodiments. Note that in FIG. 2, and in other figures generally, not all data and/or control paths are necessarily shown. Accordingly, additional communication and/or control pathways (e.g., between operand cache 215, register file 245, memory hierarchy 230, etc.) may be present in any drawing even if not otherwise indicated.

Note that in various embodiments, one or more operands may be stored simultaneously in operand cache 215, register file 245, or another data source (e.g., in memory hierarchy 230). That is, there may be two or more copies of an operand in more than one data structure in some embodiments. Various communication protocols such as cache-control protocols may be employed (e.g., via control unit 205) in such embodiments to ensure that multiple copies of operand values are consistent across different storage locations (e.g., by writing back modified data from operand cache 215, keeping track of a current value of a particular operand, etc.).

As shown, operand cache 215 is configured to provide one or more operands to execution unit 217 via one or more operand lines 207 (which may allow faster operand access time compared with register file 245 and/or memory hierarchy 230). Thus, operand cache 215 is configured to concurrently (e.g., in a same clock cycle or group of two or more clock cycles, depending on the embodiment) provide up to three different operands to execution unit 217 via lines 207 in one embodiment. In other embodiments, however, operand cache 215 may concurrently provide four operands, or any other number of operands to execution unit 217—for example, in some embodiments, the number of operands that provided from operand cache 215 may depend on an instruction set architecture (ISA). Thus, with an ISA allowing up to four source operands for a given instruction, operand lines 207 may allow up to four operands to be concurrently transmitted to execution unit 217.

Execution unit 217 is configured to execute instructions having an operator (e.g., multiply, add, multiply/add, etc.) and various operands. Thus, execution unit 217 may receive operands from operand cache 215, register file 245, and/or other data structures and pathways (though operands received from register file 245 may be received more slowly and at a greater power cost, in some embodiments, when compared with operand cache 215). In some embodiments, execution unit 217 may be pipelined at various depths. See, e.g., U.S. application Ser. No. 13/956,291, titled "INSTRUCTION SOURCE SPECIFICATION", filed Jul. 31, 2013, which is herein incorporated by reference. After processing by execution unit 217, execution unit 217 is configured to send one or more results (i.e., operand results) via one or more data transmission pathways (outputs) 219 (which may be coupled to operand cache 215, register file 245, memory hierarchy 230, and/or other structures in various embodiments). In some scenarios, one or more operands may be concurrently forwarded from execution unit 217 to two or more other structures.

Still referring to the embodiment of FIG. 2, control unit 205 may transmit and/or receive one or more control signals (that indicate operands to be stored in operand cache 215 or to be provided to execution unit 217, for example). Thus, control unit 205 may control reading from and writing to operand cache 215. Control unit 205 may include various circuitry, and be distributed in various components and/or locations in one or more embodiments (e.g., a portion of control unit 205 may be located within operand cache 215, a decode unit, attached to one or more control signal or data pathways, etc.). All or a portion of control unit 205 may be located in operand cache 215, an execution pipeline of system 200, or any other element of system 200 that may be configured to communicate control signal(s) (such as an instruction decode unit), in one or more embodiments. In other words, control unit 205 is not limited to the location(s) shown in FIG. 2.

In other embodiments, control unit 205 may include an operand cache controller (not depicted) that controls operand cache 215. Such an operand cache controller in control unit 205 may indicate the tags and states (e.g., replacement state) of storage lines/entries; decide whether a cache hit or miss has occurred; and/or control when reads and writes to operand cache 215 occur. In one embodiment, operand cache 215 simply contains data storage, and in this embodiment, states, tags, and other information may be maintained by control unit 205 (for example, by an operand cache controller within control unit 205). Accordingly, in various embodiments, cache consistency, validity, dirty bits, tags, and/or other information regarding operand cache 215 may be maintained and updated by control unit 205.

Structures and techniques discussed with reference to FIG. 2, and generally with regard to other figures herein, may be adapted or configured for use in multi-threading environments in various embodiments. Multiple threads may operate in parallel, for example, during different clock cycles. In some embodiments, execution unit 217 performs computations for multiple threads that produce several operand results to be communicated via one or more transmission pathways 219.

In one embodiment in which multiple threads are executed by execution unit 217, execution unit 217 may request certain operands from operand cache 215 based on particular thread being associated with a particular clock cycle. In some embodiments, execution unit 217 may process (or use in a particular computation) operands communicated via operand lines 207 for several clock cycles. In one embodiment, the number of clock cycles that execution unit 217 processes operands may correspond to the number of threads accessing and/or storing operands in operand cache 215. When a number of threads are executing in execution unit 217, system 200 may provide control/management over these threads via control unit 205, communicating control signal(s) via control line(s) 201, etc.

Figure 3:
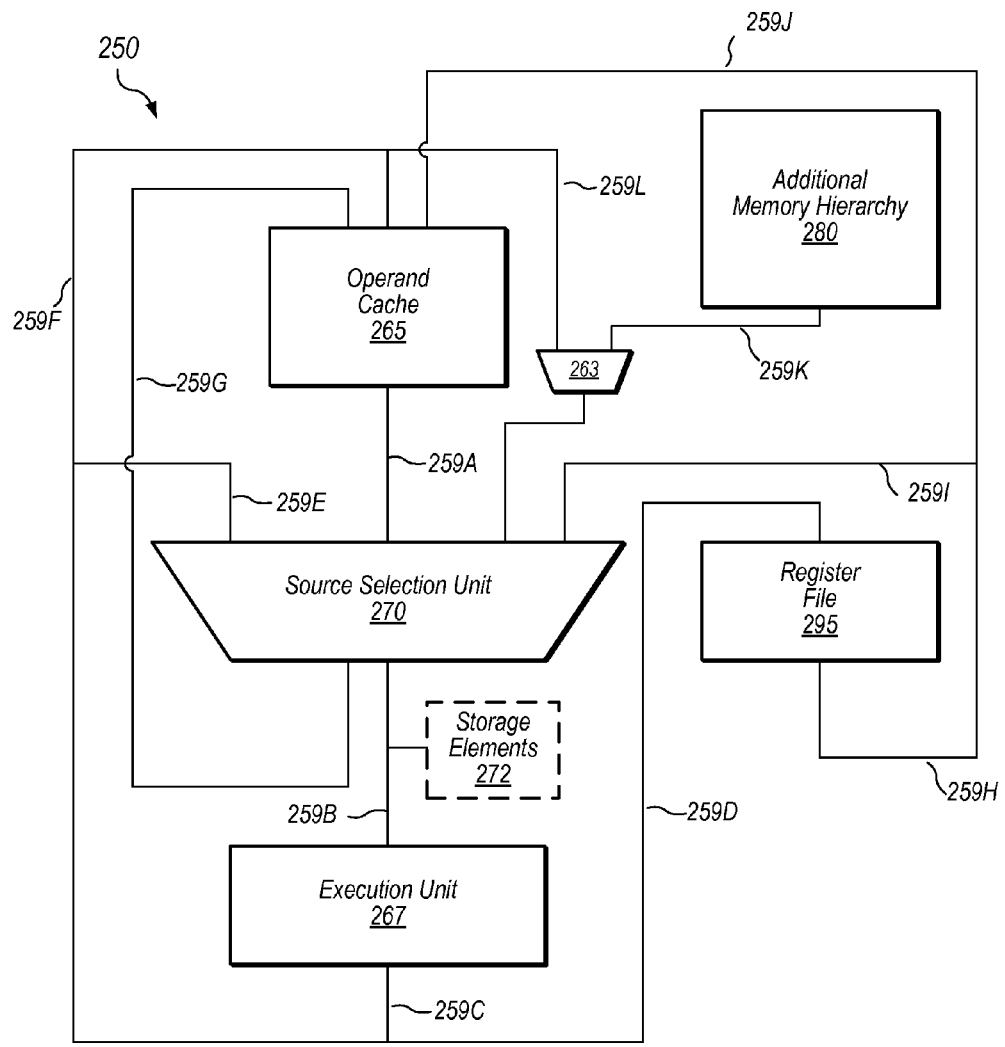
FIG. 3 is a block diagram illustrating another embodiment of an operand cache, a source selection unit, and associated structures.

Turning now to FIG. 3, block diagram 250 is shown of one embodiment of a system including operand cache 265, source selection unit 270, execution unit 267, and register file 295. In one embodiment, the structures depicted in FIG. 3 are part of shading unit 160, but may be located in other portions of a system in various other embodiments. Any or all structures, features, or functionality of the components of FIG. 2 may be suitably combined with FIG. 3 in various embodiments, and vice versa. Thus in some embodiments, operand cache 265 has some or all of the features of operand cache 215, register file 295 has some or all of the features of register file 245, etc. Various communication pathways 259A-259L, in the embodiment shown, are used to couple various structures, and may be used communicate data, control signals, etc., between different components in one or more embodiments.

In the diagram of FIG. 3, structures are shown as having inputs (various ones of communication pathways 259A-259L) as entering the top of the structure, while outputs are shown as existing from the bottom of structures via various ones of communication pathways 259A-259L. In the embodiment shown, source selection unit 270 may receive operands via pathways 259E, 259A, 259K, and 259I (which respectively correspond to outputs from execution unit 267, operand cache 265, additional memory hierarchy 280, and register file 295).

Additionally, in one embodiment, pathway 259L operates as a bypass that may be used to inject one or more operands into a different stage of an execution pipeline (which may correspond to a different active thread, in various pipelined embodiments). Thus, in some embodiments, pathway 259L may be used instead of (or in conjunction with) an output of memory hierarchy 280 that is carried on pathway 259K. In the embodiment shown, a selector 263 (e.g., a multiplexer) is configured to receive one or more operands from either pathway 259L (from the execution unit) or 259K (from the memory hierarchy) and provide the operands to source selection unit 270. Thus, in various embodiments, inputs arriving at selector 263 are guaranteed not to cause a conflict (that is, in such embodiments, an operand transmitted via path 259L will not arrive at selector 263 during a same clock cycle as an operand from path 259K). In another embodiment, register file 295 may be able to write directly to operand cache 265 via pathway 259J (bypassing source selection unit 270). See below for additional information on bypass operations. Also note that other logic structures and pathways for data and/or control information may be present in various embodiments (even if not depicted in FIG. 3).

Accordingly, as shown, source selection unit 270 is coupled to operand cache 265, execution unit 267, register file 295, and memory hierarchy 280. In various embodiments, source selection unit 270 is configured to forward operands to execution unit 267 from one or more data sources (including, for example, operand cache 265, execution unit 267, memory hierarchy 280, and register file 295) to execution unit 267. In one embodiment, source selection unit 270 is configured to concurrently provide one or more operands to both operand cache 265 and to execution unit 267. That is, in a particular clock cycle (or group of two or more clock cycles, depending on the embodiment), source selection unit 270 may forward the same operand to operand cache 265 (e.g., for storage) and to execution unit 267 (e.g., for use in computation).

Accordingly, source selection unit 270 may receive operands from one or more various data sources. For example, a particular source operand may be received by source selection unit 270 from register file 295. The particular operand that is received may be needed for a current (or currently scheduled) instruction that is being executed by execution unit 267, but the particular operand may also be needed for another (future) instruction as well. Accordingly, source selection unit may concurrently forward the operand to both the execution unit (for execution) and to the operand cache (for storage). This may avoid having to read the same operand twice from register file 295 in some embodiments, which may result in a savings of power (as it requires less power to read from operand cache 265 than to read from register file 295 in the embodiment shown).

In various embodiments, source selection unit 270 is configured to concurrently forward operands received from different sources. Accordingly, in one embodiment, source selection unit 270 is configured to receive a first operand from operand cache 265 (a first data source) and a second operand from register file 295 (a second data source), and to cause the first and second operands to be concurrently provided to execution unit 267. In general, two or more operands received from any two or more different data sources may be concurrently forwarded by source selection unit 270 in various embodiments.

In addition to forwarding operands to operand cache 265, source selection unit 270 is also configured to forward operands to memory hierarchy 280, register file 295, and/or to itself (as a feedback) in some embodiments. This forwarding may be performed concurrently (e.g., in a given clock cycle or group of two or more clock cycles, in various embodiments). Thus, an operand received from operand cache 265 may be concurrently forwarded by source selection unit 270 to both register file 295 and to execution unit 267. Likewise, in one embodiment, an operand received from memory hierarchy 280 may be forwarded to register file 295, to execution unit 267, and/or to operand cache 265. Any number of permutations of forwarding are possible in various embodiments—that is, one or more operands received from any of one or more data sources (e.g., 265, 267, 280, 295) may be forwarded without limitation to any number of those sources by source selection unit 270. Forwarding performed in this manner may result in power savings (by avoiding a data read or avoiding a more power-intensive data read) and speed execution time (e.g., by avoiding delays) in one or more embodiments.

Accordingly, operands that are produced (output) by execution unit 267 may also be forwarded, in some embodiments, to source selection unit 270, operand cache 265, register file 295, and/or memory hierarchy 280. Thus, one or more operands resulting from computation by execution unit 267 may be written back to operand cache 265 and to register file 295, in one embodiment.

In another embodiment, one or more temporary storage elements 272 are coupled between source selection unit 270 and execution unit 267. In this embodiment, providing one or more operands from source selection unit 270 to execution unit 267 includes storing the one or more operands in temporary storage elements 272. Temporary storage elements 272 may thus be configured to hold one or more operands for one or more clock cycles before providing those operands to the execution unit. This may occur, for example, when execution unit 267 is waiting for one or more additional operands from other data sources. Temporary storage elements 272 may also be utilized in multi-threaded embodiments, in which operands may be retained until a thread is ready to execute instruction. Also, temporary storage elements 272 may be used to store one or more prefetched operands, in some embodiments.

Thus, temporary storage elements 272 may hold one or more operands for one or more clock cycles in the event that execution unit 267 is executing instructions for a different thread (operands may therefore be provided to execution unit 267 after being temporarily stored for one thread in storage elements 272 until the execution unit has become free after executing an instruction for a different thread). Temporary storage elements 272 may not be present in all embodiments, however. Further, temporary storage elements 272 may also be employed in other connection pathways 259 (e.g., between execution unit 267 and operand cache 265, etc.) to delay writing (forwarding) of one or more operands for one or more clock cycles, in various embodiments. This may allow a computed result to be held temporarily until an entry in operand cache 265 is freed, in the event that operand cache 265 is full, in one embodiment.

In some embodiments, operand cache 265 is comprised of flops and/or latches. In such embodiments, operand cache 265 may be bit-aligned with execution unit 267. Bit alignment between an operand cache and execution unit may avoid unnecessary conversions or other operations (e.g., multiplexing, de-multiplexing, bit padding) in various embodiments. Thus, operand cache 265 may provide another advantage over a register file implemented with RAM in some embodiments, as the register file's RAM may not be bit-lane-aligned (e.g., bit cells in the RAM may have their own particular geometry).

Figures 4A, 4B:
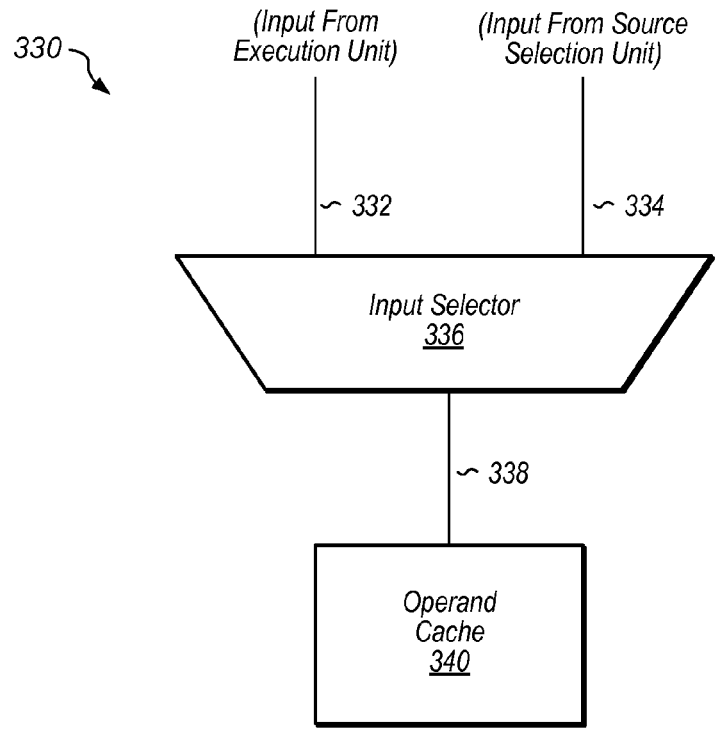
FIG. 4A is a block diagram illustrating one embodiment of the logical contents (operand data, other information) of an operand cache.
FIG. 4B is a block diagram illustrating one embodiment of an input/write mechanism for an operand cache.

Turning now to FIG. 4A, a block diagram 300 illustrating one embodiment of a logical view of an operand cache 315 is shown. Operand cache 315 includes N entries 317 in this embodiment (where N is an integer greater than one), though in some embodiments operand cache 315 may have a single entry. In one embodiment, operand cache 315 has 4 entries, while in another embodiment, operand cache 315 has 8 entries (the size of operand cache 315 is not thus limited, however, and may vary by embodiment). Operand cache 315 may have any or all of the features of operand cache 215 and/or 265, and vice versa. Furthermore, note generally, any commonly named structures in this application may include any or all features relating to other features described elsewhere in other drawings, such as register file 245 and 295 from FIGS. 2 and 3, etc.).

In the embodiment shown, operand cache 315 includes operand values 320, validity data 322, tag values 324, and last use values 326. Operand values 320A and 320B may be any suitable integer or floating point value, for example, in various embodiments. Operand values 320A and 320B may by 16 bit, 32 bit, 64 bit, or of other lengths, in one or more embodiments.

Validity data 322 is used to indicate whether a particular entry is valid. For example, if a valid bit is set to 0, then the entry is invalid (not in use). In one embodiment, validity data may be turned off in response to last-use data (e.g., an indication that an operand will not be used again). Validity data 322 may also include, in various embodiments, data indicating whether a particular operand cache entry is "dirty"—that is, whether that entry includes data that has not yet been written back to a register file (or other storage structure). If a cache entry is dirty, it may need to be written back prior to invalidation (freeing the entry), as will be understood by those with skill in the art. In some embodiments, validity data may be used for a portion of an entry. For example, an entry in operand cache 315 may contain multiple fields (high bits, low bits, etc.), each of which may have its own valid and dirty bit.

Note that in multi-threaded embodiments, there may be additional storage in an operand cache for each element of a subset of threads that are currently executing. In such embodiments, information stored in an operand cache (or associated structure) may include a thread ID per thread slot. In one embodiment, when one thread (e.g., a currently executing thread) is replaced by another thread, any remaining dirty entries from the previous thread may be marked with new validity data indicating that the entry is dirty, but that it is from a prior thread. This may allow a new thread to immediately begin using at least a portion of an operand cache (e.g., entries that are not dirty entries belonging to the prior thread) while the prior thread's dirty entries are flushed out to a register file (or other storage), in various embodiments. Such an approach may reduce or eliminate operand-cache related delays when switching from one thread to another, in one or more embodiments.

Tag values 324, in the embodiment shown, hold tag data that is usable to match an entry in operand cache 315 to a particular instruction, operand, and/or thread. For example, tag value 324A may contain information usable to determine that operand value 320A corresponds to a particular source operand for a specific program instruction. Accordingly, tag values 324 may be implemented using various techniques known to those with skill in the art, in different embodiments.

In some embodiments, information depicted in operand cache 315 may be maintained (or have a separate copy maintained) in one or more other structures. In one embodiment, for example, tag values 324 are maintained in a separate structure in a decode unit or decode stage of an execution pipeline. Thus, in some embodiments, cache hits and cache misses into operand cache 315 are determined at instruction decode. Copies of operand values may likewise be stored in a register file or other structures (e.g., additional memory hierarchy). Operand cache 315 may also store additional information or include other features not depicted in the embodiment of FIG. 4A.

Turning now to FIG. 4B, a block diagram 330 is shown of one embodiment of an operand cache having a single write (input) port. As shown, FIG. 4B includes an operand cache 340 and an input selector 336. Input selector 336 is configured to route a plurality of inputs 332 and 334 to the single write port 338 of operand cache 340. By having only a single write port (rather than multiple write ports), operand cache 340 may conserve additional power in various embodiments. However, input selector 336 allows operand data from different portions of an execution pipeline to be stored in operand cache 340 (e.g., from a source write and from an execution write).

In various embodiments, each of two or more inputs arriving at input selector 336 are guaranteed not to conflict for a single write cycle. Thus, in one embodiment, an operand to be written to operand cache 340 from a source selection unit will never arrive at the same time as an operand to be written from an execution unit. Avoiding collisions at write port 338 may be accomplished by strict pipeline ordering, in various embodiments.

Figure 5A:
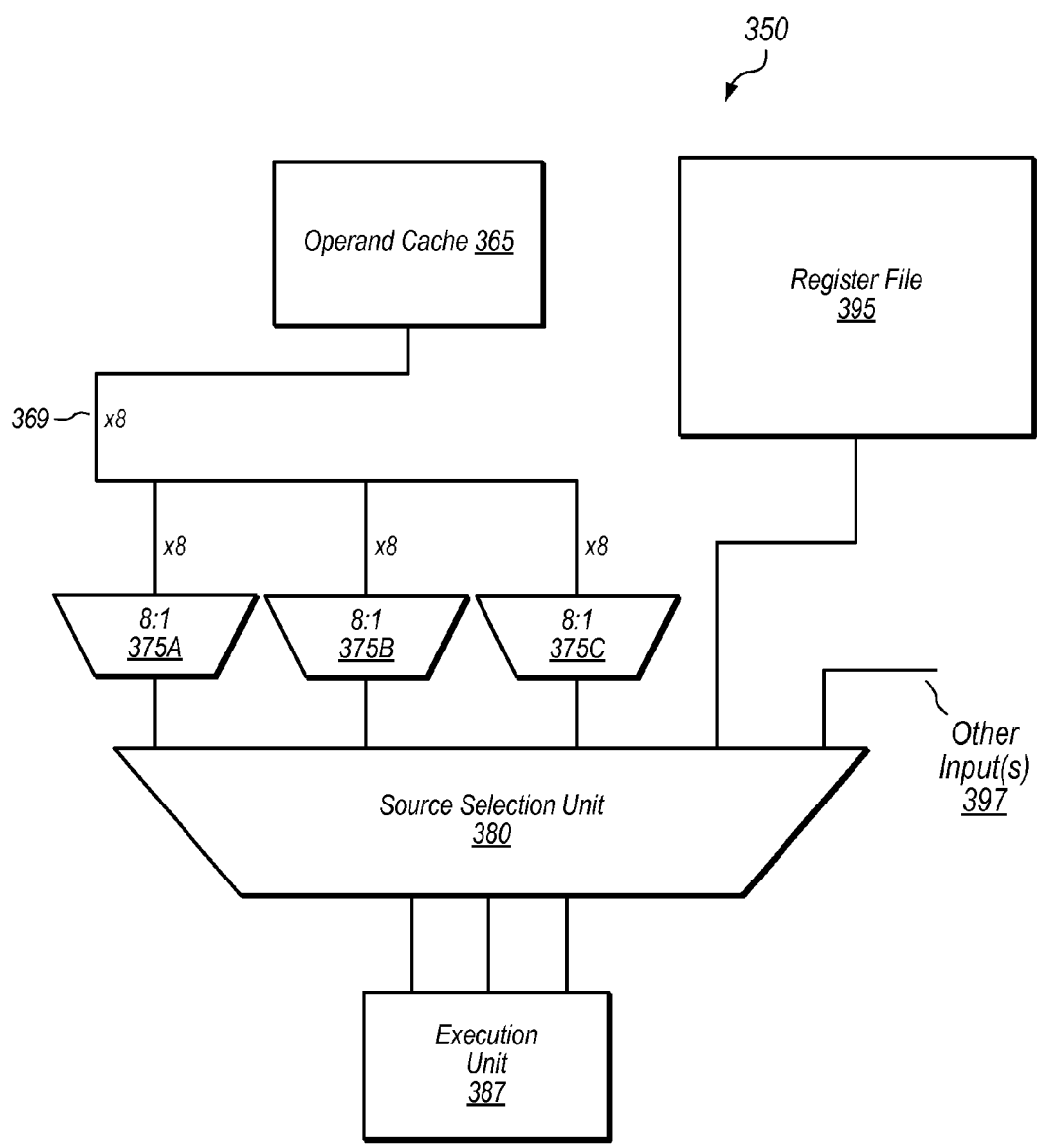
FIG. 5A is a block diagram illustrating one embodiment of an operand cache that is coupled to a source selection unit and a group of selectors.

Turning now to FIG. 5A, a block diagram 350 is shown of a system that includes an operand cache 365 coupled to a source selection unit 380 via a plurality of selectors 375A-375C. In this embodiment, operand cache 365 includes eight (8) different operand entries (not shown), and accordingly, a group of eight communications lines 369 (e.g., word lines) are configured to provide access to stored operands in operand cache 365. (Different numbers of operand entries and data connections are possible in other embodiments.) In the embodiment of FIG. 5A, selectors 375A-375C are 8:1 multiplexers, but may also vary in other embodiments.

In various embodiments, each one of selectors 375A-375C may be activated in order to provide a particular source operand to source selection unit 380. Note that the term "source operand", as used herein, refers to an operand that will be used as a source, e.g., in order to calculate a result. Thus, the term "write operand", as used herein, refers to an operand that is calculated, e.g., produced by execution unit 387, as a result of an instruction. In the embodiment of FIG. 5A, in the event that a particular instruction does not require an operand from one or more of selectors 375A-375C, one or more of selectors 375A-375C (i.e., a subset of the selectors) may not be activated. This may reduce power consumption, for example, if an instruction requires only two source operands. Source selection unit 380 may concurrently forward up to three operands to execution unit 387 in the embodiment of FIG. 5A. Furthermore, source selection unit may receive operands (to be forwarded) from register file 395 and/or one or more other inputs 397 (which could be write operands from execution unit 387, data from a memory hierarchy, or another source). Again, note that additional pathways and/or structures not shown in FIG. 5A may exist in various embodiments.

Figure 5B:
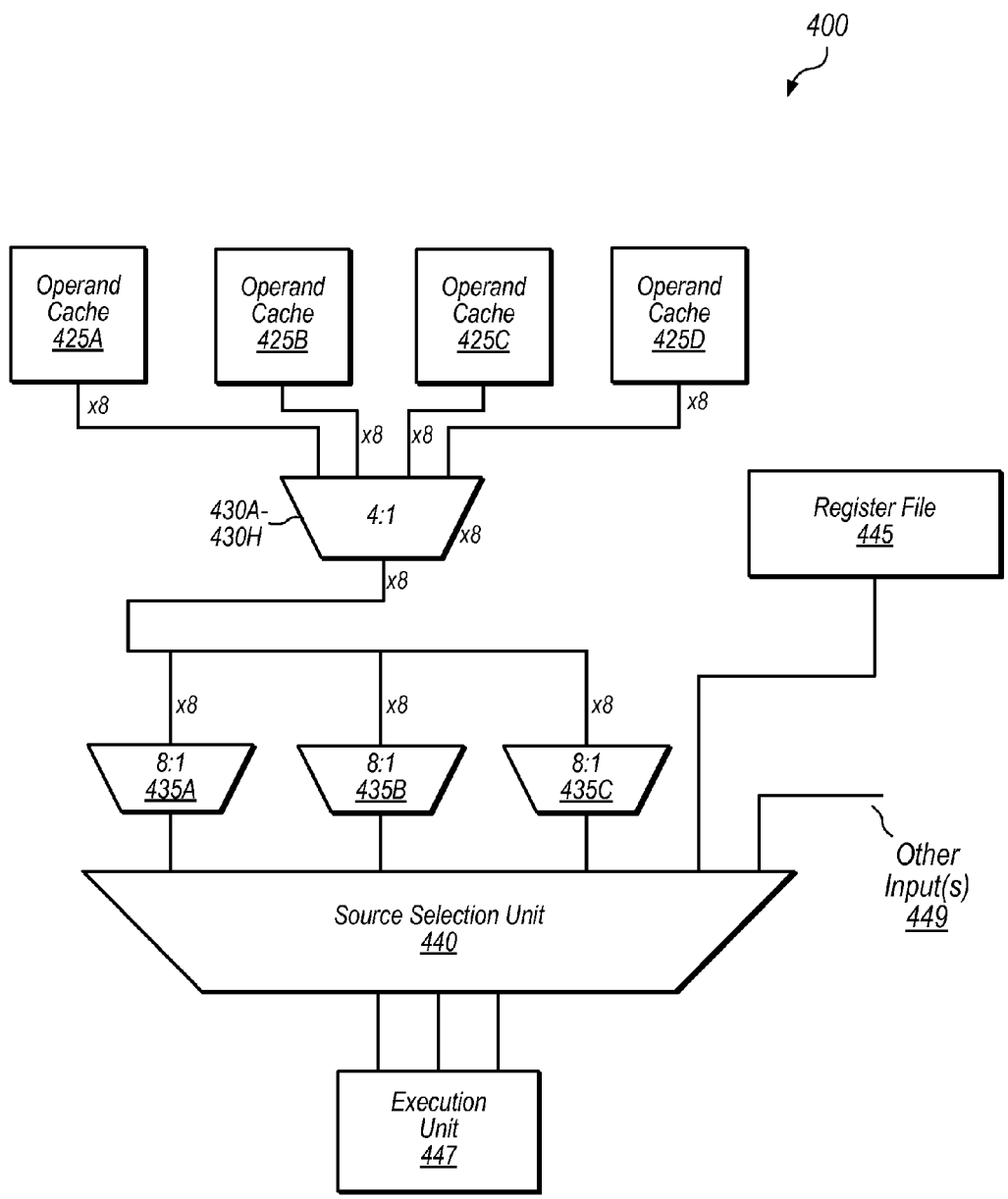
FIG. 5B is a block diagram illustrating another embodiment of an operand cache that is coupled to first and second groups of selectors.

Turning now to FIG. 5B, a block diagram 400 is shown of a system that includes a plurality of operand caches 425A-425D, a first group of eight (8) selectors 430A-430H, and a second group of selectors 435A-435C. In some embodiments, each of operand caches 425A-425D corresponds to different groups of one or more threads (which may be pipelined to execute in strict order in one or more embodiments. Although depicted as separate structures in FIG. 5B, one or more of operand caches 425A-425D may also be combined into a single structure in various embodiments (e.g., via shared storage elements). In the embodiment shown, there are four operand caches 425A-425D that each corresponds to exactly one thread.

In one embodiment, source selection unit 440 may receive operands (to be forwarded) from register file 445 and/or one or more other inputs 449 (which could be write operands from execution unit 447, data from a memory hierarchy, or another source). In the embodiment shown, source selection unit 440 may concurrently forward up to three operands to execution unit 447, but note that additional pathways and/or structures not shown in FIG. 5A may exist in various embodiments.

In one embodiment, selectors 430A-430H are configured to receive operands from operand caches 425A-425D and to provide them to execution unit 447 via selectors 435A-435C and source selection unit 440. In the embodiment shown, selectors 430A-430H are each 4:1 multiplexers, and operand caches 425A-425D each have eight entries. Accordingly, in this embodiment, selector 430A is configured to provide an operand by selecting from the respective first entries (e.g., entry 0) of operand caches 425A, 425B, 425C, and 425D. Thus, in a given clock cycle (or group of clock cycles) in various embodiments, selector 430A will provide one operand from one of the first (logical) entries for operand caches 425A-425D. Likewise, in the embodiment shown, selector 430B is configured to provide one operand by selecting from a group of second logical entries that respectively correspond to operand caches 425A-425D. Thus, there are eight total selectors in the embodiment of FIG. 5B to allow for selecting (reading) from the eight entries in each of operand caches 425A-425D. Thus, each of the selectors 430A-430H is configured to select an operand cache entry from one of four threads (e.g., a thread corresponding to one of the four operand caches 425A-425D) in one or more embodiments.

Selector 435A is an 8:1 multiplexer in the embodiment of FIG. 5B, and is configured to select an operand from one of eight incoming communication lines that are coupled to the first group of (eight) selectors 430A-430H. Accordingly, in one embodiment, a first input for selector 435A will carry the output of selector 430A, while a second input for selector 435A carries the output of selector 430B, etc. Input lines for selectors 435B and 435C may be similarly arranged in various embodiments (e.g., a fifth respective input for selectors 435B and 435C carries the output from selector 430E).

Source selection unit 440, as shown, is configured to concurrently receive a maximum of three operands (via selectors 435A, 435B, and 435C), and provide (up to) those three operands to execution unit 447 (though in other embodiments, a different number of selectors 435 and operands may be used). Accordingly, it may only be necessary to activate a subset of one or more of the first group of selectors 430A-430H (which could concurrently read up to eight operands from operand caches 425A-425D, if desired). As one example, the following operand entries might be concurrently provided to source selection unit 440:

Operand cache 425A, entry 0;
Operand cache 425A, entry 4; and
Operand cache 425A, entry 6.

In this scenario, it is only necessary to activate selectors 430A, 430D, and 430F (respectively corresponding to entries 0, 4, and 6 of operand cache 425A). Because no operands are being read from any of entries 1, 2, 3, 5, or 7 in operand caches 425A-425D in this example, there is no need to activate the corresponding five selectors that are configured to read from those entries. Accordingly, activating only a subset of the first group of selectors 430A-430H may save energy in various embodiments (e.g., by avoiding unnecessarily reading operands that will not be used by source selection unit 440, and would otherwise simply be discarded).

Note that in the example above, all operands were read from a same operand cache (425A) for one particular thread. Pipelined execution of instructions means that, in some embodiments, only one of operand caches 425A-425D will be read from in a given read cycle for a thread, and other operand caches will not provide operands during that read cycle. In other embodiments, however, it may be possible to read from different ones of operand caches 425A-425D during a given read cycle. Thus, as another example, the following operand entries may be concurrently provided to source selection unit 440:

Operand cache 425A, entry 0;
Operand cache 425B, entry 3;
Operand cache 425D, entry 7.

In this example, selectors 430A, 430D, and 430H would be activated in order to read the operands. An activator may be used to activate a given selector, as discussed below.

Note that in various embodiments, the phrase "activating a selector" refers to allowing corresponding circuit logic (e.g., CMOS logic) to switch based on one or more signals. For example, because CMOS logic consumes energy when signals switch, it is possible to avoid excess energy consumption by not switching based on a signal if that signal is not needed. Thus, in one embodiment, a selector is said not to be activated if one or more input signals are suppressed or ignored (e.g., regardless of whether that signal has changed). Clock gating can be used in order to avoid unnecessarily activating circuit portions (for example, one or more portions of one or more operand caches that are not needed for a particular instruction).

Figure 5C:
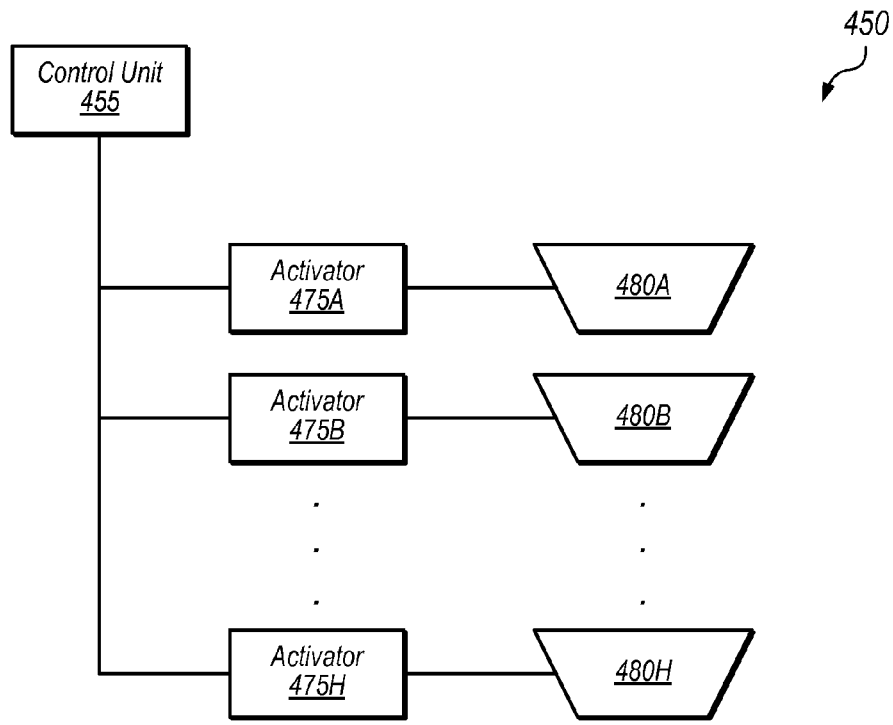
FIG. 5C is a block diagram illustrating a group of activators coupled to group of selectors (which may be used to read operands, in some embodiments).

Turning now to FIG. 5C, one embodiment of a system 450 including a plurality of activators 475A-475H and a corresponding plurality of selectors 480A-480H is shown. In this embodiment, activator 475A is configured to power corresponding selector 480A, activator 475B is configured to power corresponding selector 480B, etc. In one embodiment, activators 475A-475H are flip-flops that are configured to drive selectors 480A-480H (which may be multiplexers). If an operand is not required from a particular one of selectors 480A-480H in one embodiment, the corresponding activator (e.g., flip-flop) will not change state, and the output of the multiplexer will not toggle.

In various embodiments, activators 475A-475H may receive enable inputs (signals) indicating whether or not a particular operand will be read from an operand cache. In the embodiment shown, control unit 455 is configured to provide these enable signals to the activators, but enable signals may be provided by any suitable structure in various embodiments. In one embodiment, enable signals may be sent to activators 475A-475H via a decode unit or decode stage of a an instruction pipeline. Any selector (not just those shown in FIG. 5C) may have a corresponding activator in various embodiments. Thus, in the embodiment of FIG. 5B, selectors 430A-430H may also have corresponding activators such as 475A-475H. Referring back to the embodiment of FIG. 5A, selectors 375A-375C may also have one or more corresponding activators. (Note again that generally, structures shown in various figures may be usable with any or all of the features described relative to similarly named structures in other figures; thus, selectors 430A and 480A may be identical, in some embodiments, and may have corresponding activators (e.g., flip-flops)). In some embodiments, a single activator (structure) may be used to power two or more selectors. In such embodiments, the single activator may individually control each of the two or more selectors. Note that in various embodiments, an actual select signal used for a particular selector may be predetermined based simply on which thread is currently executing (e.g., selectors not needed for the current thread will not be activated).

Figure 5D:
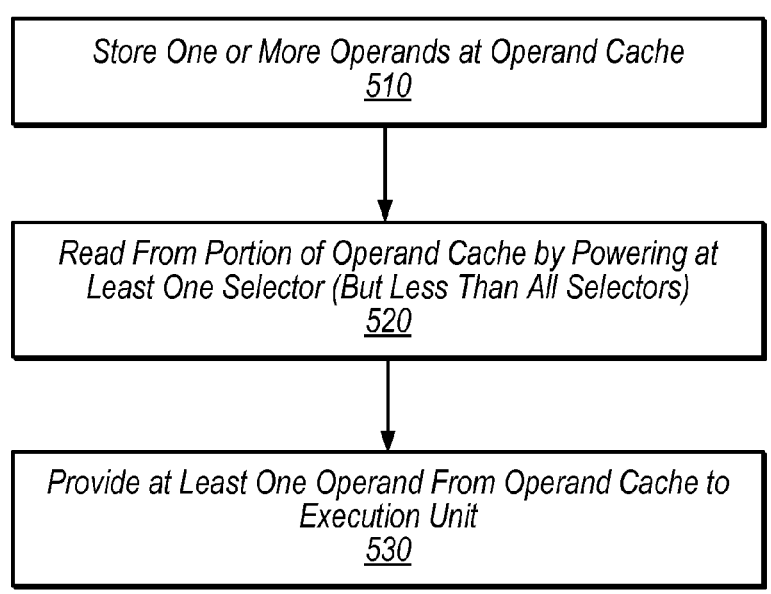
FIG. 5D is a flow chart of one embodiment of a method relating to storing one or more operands in a register file.

Turning now to FIG. 5D, a flow diagram is shown of one embodiment of a method 500 that relates to storing one or more operands at an operand cache. In one embodiment of step 510, one or more operands are received from a register file and stored at an operand cache, which is coupled to a plurality of selectors (e.g., selectors 375A-375C discussed above). In step 520, a portion of the operand cache is read from by powering at least one of the plurality of selectors, but less than all of the selectors coupled to the operand cache.

This may save power, in some embodiments, by reducing a number of active circuit portions (and thus, one or more activators may be used to power the selector(s) used to read from the operand cache). In step 530, at least one operand is provided from an operand cache to an execution unit. Step 530, in the embodiment shown, consumes less power than would be used by providing the at least one operand from the register file. That is, in this embodiment, reading the at least one operand from the operand cache is cheaper from a power perspective than reading that operand from the register file. At least part of this power savings is due to the use of selectors, in various embodiments. The operand cache used in method 500 may also be bit-aligned with an execution unit in one embodiment.

Use of Hint Bits and Last Use Bits with Operand Cache

As discussed above, operand caches may increase energy efficiency and/or speed execution by allowing access to operands at reduced power and with reduced access time. Because an operand cache is generally going to be a smaller storage structure than a register file for which it acts as a cache (in various embodiments), only a limited number of operands may be stored in the operand cache. Accordingly, one or more schemes may be used for determining which operands are cached and which are not.

Various schemes are possible in which the decision of whether or not to store a particular operand in an operand cache is determined on one or more criteria. For example, in one hardware-based embodiment, hardware would attempt to cache all write operands, possibly using least-recently used (LRU), pseudo-LRU, or a pseudo-random replacement mechanism. In another embodiment, all source and write operands for a particular thread are cached whenever possible. In some embodiments in which results of individual memory load/store instructions are cached (instead of register operands), where there is a single value to cache, instruction hints may be used to bypass an operand cache or to specify that the cached result is to be treated as transient (use once). In another embodiment, a register file might be partitioned such that a part of it would be "always cached" in an operand file, while another part would be "never cached." In such a scheme, register number may imply whether or not a particular operand should be cached (e.g., registers 0-39 might be viewed as having an implicit hint value to store operands in an operand cache, while registers 40-79 would be viewed as having no such hint value (caching suggestion)). In some embodiments, however, information provided by software (such as a compiler) may be used to better optimize what operands are stored by an operand cache.

Turning now to FIG. 6, a block diagram 600 is shown of one embodiment of an instruction format 610 in which hint values (e.g., hint bits) are used to determine whether a particular operand should be cached. Instruction format 610, as shown, includes an instruction preamble 612 and an instruction 614. Instruction preamble 612, in various embodiments, may not be part of an actual instruction, but instead be maintained as separate information associated with the instruction. In other embodiments, however, a preamble may be included as part of the instruction itself (Thus, in various embodiments, instructions lacking a preamble may still be fully executable.)

Instruction format 610 may include additional information not shown, and may be adapted to a variety of formats in different embodiments. See, e.g., the '291 Application ("INSTRUCTION SOURCE SPECIFICATION") for one or more exemplary formats that include source re-mapping, which may be used in conjunction with operand cache structures in various embodiments.

As shown, instruction preamble 612 includes one or more hint values 615. Hint values 615 may be used, in various embodiments, to specify that one or more operands should be cached (i.e., stored) by an operand cache. In one embodiment, for each source operand and write operand of an instruction, that operand may have a corresponding hint value. For example, if an instruction format allows up to three source operands and one write operand, there may be four corresponding hint values. An instruction therefore might have the following hint value mapping:

| | | |
|---|---|---|
| Source operand 1: | 0 | (caching not suggested) |
| Source operand 2: | 1 | (caching suggested) |
| Source operand 3: | 0 | (caching not suggested) |
| Write operand: | 1 | (caching suggested) |

In this example, the second source operand for the instruction may be cached, but not the other source operands. Further, the write operand (output) of the instruction may also be cached.

In embodiments in which hint values are used, caching of source operands may be performed according to various techniques. In one embodiment, a source operand may be cached in association with that operand being read from a register file (or another structure). For example, a source operand may be read from a register file and concurrently provided to both an execution unit and to an operand cache (which would allow the operand to be immediately used by the execution unit, but also store a copy of the operand in the operand cache for future use). In other scenarios, a source operand may be prefetched into an operand cache (e.g., as discussed below). Write operands may also be cached in an operand cache in association with execution of an instruction by an execution, in various embodiments. For example, after an execution calculates a result, that result may be stored in an operand cache.

Accordingly, in one embodiment, one or more hint values 615 for an instruction may be determined by software (such as a compiler) based on one or more specified criteria. In response to such a determination, one or more hint values may be stored in an instruction stream that includes the instruction. Storing a hint value in an instruction stream may include, in various embodiments, storing the hint value in an instruction preamble (e.g., 612), storing the hint value in an instruction encoding itself (e.g., 614), or otherwise storing the hint value so as to be associated with a particular instruction (and/or that instruction's particular operands). Hint values stored in an instruction stream may be stored on computer-readable storage mediums in various embodiments.

In one embodiment, hint values are determined based on a first instruction and a second (possibly subsequent) instruction in an instruction stream that both use a first operand as a source operand. If a first instruction requires a particular operand, for example, and another instruction (possibly subsequent, i.e., later in program order) also requires the same particular operand, it may be beneficial to cache that operand so that the second instruction does not have to perform an expensive read from a register file. Instead, the second time that particular operand is needed, it may be inexpensively provided by an operand cache.

Another criterion that may be used in determining hint values, in some embodiments, is whether first and second instructions are within a certain distance of each other in program execution order. For example, if first and second instructions both require a particular operand, but there are a large number of intervening instructions that appear after the first instruction in program order and before the second instruction, it may not make sense to cache the particular operand, as the particular operand might have to reside in the operand cache for a long period of time before being accessed again. Accordingly, in some embodiments, one or more threshold closeness values may be used in order to determine whether a hint value should be used for a particular operand (e.g., caching may be suggested for a common operand in instructions that are only 2 or 4 instructions apart, but instructions that are hundreds of instructions apart may not have caching suggested via a hint bit (though determining whether to suggest caching via a hint value is not limited to these examples)).

In yet another embodiment, another criterion that may be used in determining hint values is whether two or more instructions share a common operand with a first instruction. For example, because storage in an operand cache may be limited, in some scenarios, it may be advantageous to cache an operand that will be used again multiple times in the future (but perhaps not cache an operand that is only used once in the future). If only one storage element in an operand cache is available at a given time during program execution, for example, a compiler might choose to suggest caching for the operand that will be used the most number of times in the (near) future. Thus, in some embodiments, one operand for a first instruction may have a corresponding hint value indicating that it should be cached, while another (second) operand for the same instruction may have a corresponding hint value indicating that it should not be cached. Note, however, that in some scenarios it may be preferable to simply cache whatever operand is used next (nearest future operand), as it may be possible to cache that operand again for subsequent use without reading it from a register file. Thus, in various embodiments, the number of times a particular operand is used is not actually a criterion for determining whether or not to store that particular operand in an operand cache.

Generally, various cost functions may be assigned to any given operand indicating the value of caching that operand. Such a cost function may be used when determining whether the given operand should be cached (i.e., have a corresponding hint value set). Cost functions can be globally calculated (e.g., during compile) and the most beneficial caching choices can then be encoded into hint bits. Some things that may enter into the cost function may include: whether the operand causes a bank conflict in the register file (if not cached), an estimate of the energy savings associated with caching the operand (for example, a number of register file accesses that are saved), whether there is a need to cache an operand at all (e.g., an operand that is forwarded during its last-use does not need to be cached or written to the register file), a likelihood of the corresponding cache entry surviving to its use (e.g., if a thread is likely to be moved out of the execution pipeline prior to the use of the operand cache entry, then caching may not have a high value), and other factors. Furthermore, note that in order to calculate a cost function to determine if an operand should be cached, it may be necessary in some embodiments to have: a compiler-predictable replacement algorithm for the operand cache (that is, the compiler may provide direct control of the operand cache by indicating that an entry should be replaced); strict barrel pipelining of an execution unit so that bank conflicts can be accurately predicted by the compiler; and/or separate per-thread storage in the operand cache (to avoid unpredictable cross-thread corruption of the operand cache state).

Note that in some embodiments, write operands may also be cached according to hint bits. For example, a write operand of a first instruction may be cached so that the write operand can be used as a source operand for a second (subsequent) instruction. Accordingly, hint values may be used on write operands (outputs from execution) to indicate that a particular result should be cached in an operand cache.

Note that in some embodiments, hint values for an operand may optionally be ignored by hardware. That is, in such embodiments, hardware is not required (or guaranteed) to cache a particular operand, even if that operand has a hint value that suggests caching. In the event that an operand is not cached, for example (even if it has a hint value indicating it should be), the operand will still be available from a register file (or other structure). Thus, in some embodiments, hint values may be viewed as suggestions to cache, not requirements, and in various embodiments, a cache miss on an operand cache simply means that an operand will have to be fetched from somewhere else. In other embodiments, however, hardware may be required to cache any operand having an appropriate hint value. In embodiments in which caching is required, an operand having an appropriate hint value may replace an existing entry in an operand cache.

Still referring to FIG. 6, instruction format 610 may also include one or more last use values 620 for an instruction. Last use values 620 may be used, in various embodiments, to indicate that a given operand will not be used again and may safely be discarded without writing the operand back to a storage structure (such as an operand cache or register file). During execution of instructions, for example, there may be a number of intermediate operands that are not final results (e.g., a final pixel value). Thus, when a given operand is indicated as being a "last-use", it need not be retained in an operand cache. Accordingly, in one embodiment, an apparatus (e.g., GPU) may be configured to not make any additional writes of an operand to an operand cache, register file, or other structure (e.g., memory hierarchy) in response to last-use values (which may be specified on a per-operand basis for both source and write operands, in various embodiments). (Also note that last-use values for a particular operand may be used to invalidate a corresponding operand cache entry, in various embodiments.)

Turning now to FIGS. 7A-7C, a series of block diagrams is shown depicting an operand cache as it relates to a cache eviction and cache write process. As shown in FIG. 7A, operand cache 650 is configured to store four entries that include operand values 652, 654, 656, and 658. Validity data 653, 655, 657, and 659 indicates that all of the operand values are currently valid. Operand cache 650 is full as being shown in FIG. 7A, however, and has no additional room for another operand without evicting (freeing) one or more of its entries. Accordingly, if a first operand is to be cached (e.g., has an appropriate corresponding hint value), a second operand may be evicted from operand cache 650 in the event that operand cache 650 is full, in one or more embodiments.

Turning now to FIG. 7B, operand cache 650 is depicted with its second entry having been evicted (freed). Validity data 655 indicates that this entry is no longer valid. In response to being evicted, operand value 654 (formerly stored in the operand cache) may be written back to a register file, additional memory hierarchy, etc., in various embodiments. In some embodiments, an evicted operand is not written back to a register file (or other structure) unless the operand is "dirty." (If an unmodified copy of the operand already exists in a register file, however, there may be no need to write back the evicted operand value.)

Various eviction schemes for operand cache 650 may be used in different embodiments. In one embodiment, non-dirty (clean) entries are always evicted first when operand cache 650 is full. In another embodiment, the least-recently used "dirty" entry is evicted. In one embodiment, evicted operand cache entries may be written back (stored) to a different location, such as a second register file, or other structure in a memory hierarchy.

Turning now to FIG. 7C, operand cache 650 is shown after having a new entry written to it (following the eviction process as discussed relative to FIG. 7B). Operand value 660 corresponds to a different operand, and is also shown as being valid in this figure. Note that additional data (not depicted) may also be present in operand cache 650 (e.g., tags, dirty bits, thread information, etc.).

Operand Forwarding and Bypassing

In various embodiments, a system including an execution unit and an operand cache (e.g., the system of FIG. 3) is configured to forward operands, using one or more bypasses (e.g., communication line). Forwarded operands may be output from an execution unit or other structure(s), in various embodiments. Operands that are forwarded via a bypass, in some embodiments, are not written into an operand cache, register file, and/or other storage structure (when a last-use bit is set for an operand, for example). Instead, the forwarded operands may be immediately consumed by another instruction that is in the execution pipeline.

Returning to FIG. 3 for the purposes of discussing operand forwarding, the system of block diagram 250 allows various operands to be forwarded via various ones of communication lines 259A-259L. In some embodiments, an operand that is an output of execution unit 267 may be forwarded to an input of execution unit 267 for a subsequent instruction. For example, execution unit 267 may forward an operand to source selection unit 270, which may in turn forward the operand back to an input of execution unit 267. In another embodiment, an operand may be forwarded directly to execution unit 267 (e.g., without an intermediary). In some embodiments, execution unit 267 may include multiple execution stages, and may output operands from one or more of these execution stages. In one embodiment, execution unit 267 is configured to allow retention of source operands (for example, execution unit 267 might notice that a source operand is used for multiple instructions, and thus simply retain the operand value in a source register at the top of the execution unit).

In some embodiments, an operand may be forwarded from execution unit 267 to register file 295 for storage (e.g., without being stored in operand cache 265). In one embodiment, however, an operand forwarded from execution unit 267 will be forwarded to an output of register file 295. By forwarding to an output line in such an embodiment, register file 295 may be bypassed entirely—that is, the forwarded operand may not be stored in register file 295, but is instead used in place of an output from register file 295 (e.g., the output line connecting register file 295 to source selection unit 270). This may allow the forwarded operand to be treated as an output of register file 295 for all effective purposes, even though a read was not actually performed on the register file, in one or more embodiments. Such bypassing may be useful when the timing of one instruction in the execution pipeline will require a forwarded operand at the time (clock cycle) at which the forwarded operand arrives. In other words, because the forwarded operand is being used immediately, there may be no need to store the forwarded operand in register file 295 (which may save additional energy). This avoiding of a potentially unnecessary write may apply in scenarios in which the forwarded operand is on its "last use" (and can be discarded after consumption).

Similarly, operands may be forwarded from execution unit 267 to operand cache 265 and/or to memory hierarchy 280 in some embodiments. As with register file 295, in various embodiments, operands forwarded to operand cache 265 and/or memory hierarchy 280 may be stored by those structures upon arrival of the operands. In some scenarios, however, forwarded operands may bypass storage entirely, and simply be provided, e.g., as if the forwarded operand were an output of operand cache 265 and/or memory hierarchy 280 (even though no read may be performed from those structures). Thus, in one embodiment, an operand could be forwarded to an output of operand cache 265, an output of memory hierarchy 280, and/or an output of register file 295. Operands may be concurrently forwarded to multiple locations (e.g., from execution unit 267 to an operand cache and a register file) in various embodiments. In some embodiments, operands that have been prefetched may be forwarded to two or more locations (e.g., an operand prefetched from a register file may also be concurrently forwarded to both an execution unit and operand cache).

Instructions at different stages of an execution pipeline may use forwarded instructions (e.g., a subsequent instruction may use a forwarded instruction without having to store that instruction in operand cache 265 or register file 295, for example). This may further save energy during execution in various embodiments—particularly when instructions have a high degree of interdependence and generate a large number of intermediate operands that are not ultimately used as program execution results, as may be the case in graphics applications such as shading.

Intelligent Operand Prefetching

Figure 8:
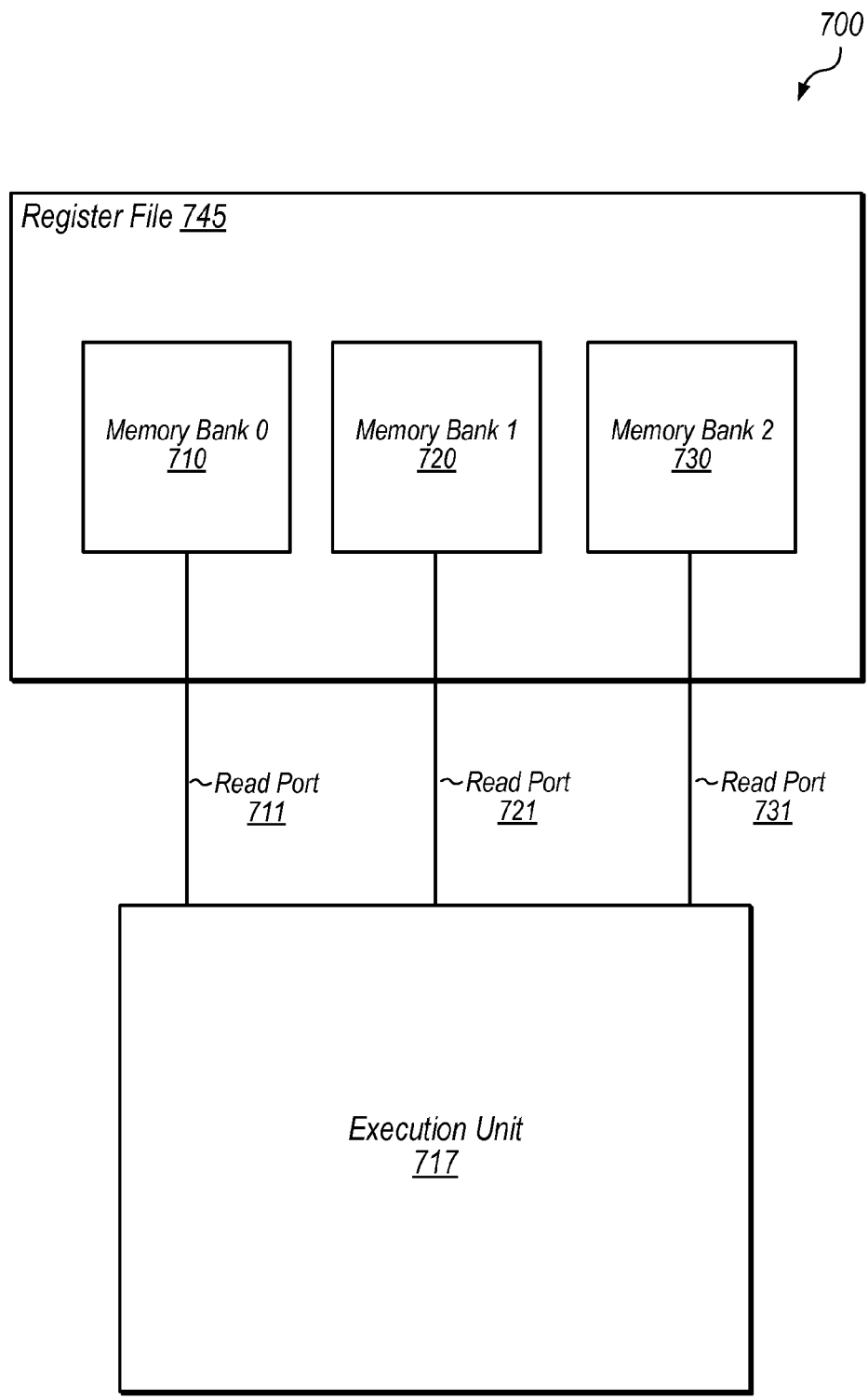
FIG. 8 is a block diagram of one embodiment of a register file that includes a plurality of memory banks and read ports.

Turning now to FIG. 8, a block diagram 700 is shown of one embodiment of a register file 745 that includes three memory banks 710, 720, and 730. Each of memory banks 710, 720, and 730 is configured to store operand data in the embodiment of FIG. 8, and to provide operands to execution unit 717 via read ports 711, 721, and 731.

Execution unit 717 may be configured to execute instructions having up to N possible source operands (where N is a positive integer) in various embodiments. Thus, in one embodiment, instructions to be executed by unit 717 may use up to three possible source operands. In another embodiment, instructions may have up to four possible source operands, while yet other instruction sets with different numbers of possible source operands are contemplated in other embodiments. (Note that instructions also have one or more possible write operands (outputs) in varying embodiments.)

In some embodiments, each one of read ports 711, 721, and 731 is configured to read a single operand at a time from its corresponding memory bank. Accordingly, if two or more operands for a particular instruction are stored in the same memory bank (e.g. bank 710), for example, then it may take two or more successive read cycles from bank 710 in order to fetch all the necessary operands for that particular instruction. This scenario is referred to as a "bank conflict" in various embodiments, and may slow overall execution because an instruction may need to stall until all operands are read, for example. Bank conflicts may therefore be harmful to performance.

As one example of how bank conflicts may arise, consider an instruction format in which a given instruction may have up to a maximum of three source operands. For an instruction that uses all three source operands (the maximum number), the following operand locations within register file 745 could be used for storing operands, in varying embodiments:

| Scenario A (One Read Cycle) | |
| --- | --- |
| Operand 0 | stored in bank 0 (710) |
| Operand 1 | stored in bank 1 (720) |
| Operand 2 | stored in bank 2 (730) |

In this scenario, because each operand is stored in a separate bank in this scenario, in one embodiment it is possible to concurrently read all operands from register file 745.

| Scenario B (Two Read Cycles) | |
| --- | --- |
| Operand 0 | stored in bank 1 (720) |
| Operand 1 | stored in bank 1 (720) |
| Operand 2 | stored in bank 2 (730) |

In Scenario B, however, it may be necessary to use two read cycles to acquire all operands, because of a bank conflict in bank 1 (720) between Operand 0 and Operand 1.

| Scenario C: Three Read Cycles | |
| --- | --- |
| Operand 0 | stored in bank 1 (720) |
| Operand 1 | stored in bank 1 (720) |
| Operand 2 | stored in bank 1 (720) |

Lastly, in Scenario C, all three source operands (the maximum number in this example) are located in the same memory bank. Thus, in this example, it may take three consecutive read cycles to acquire all operands and resolve the bank conflict, potentially slowing execution even further. By using intelligent prefetching, however, bank conflicts can be avoided or reduced, and overall execution efficiency may be improved in various embodiments.

Figure 9:
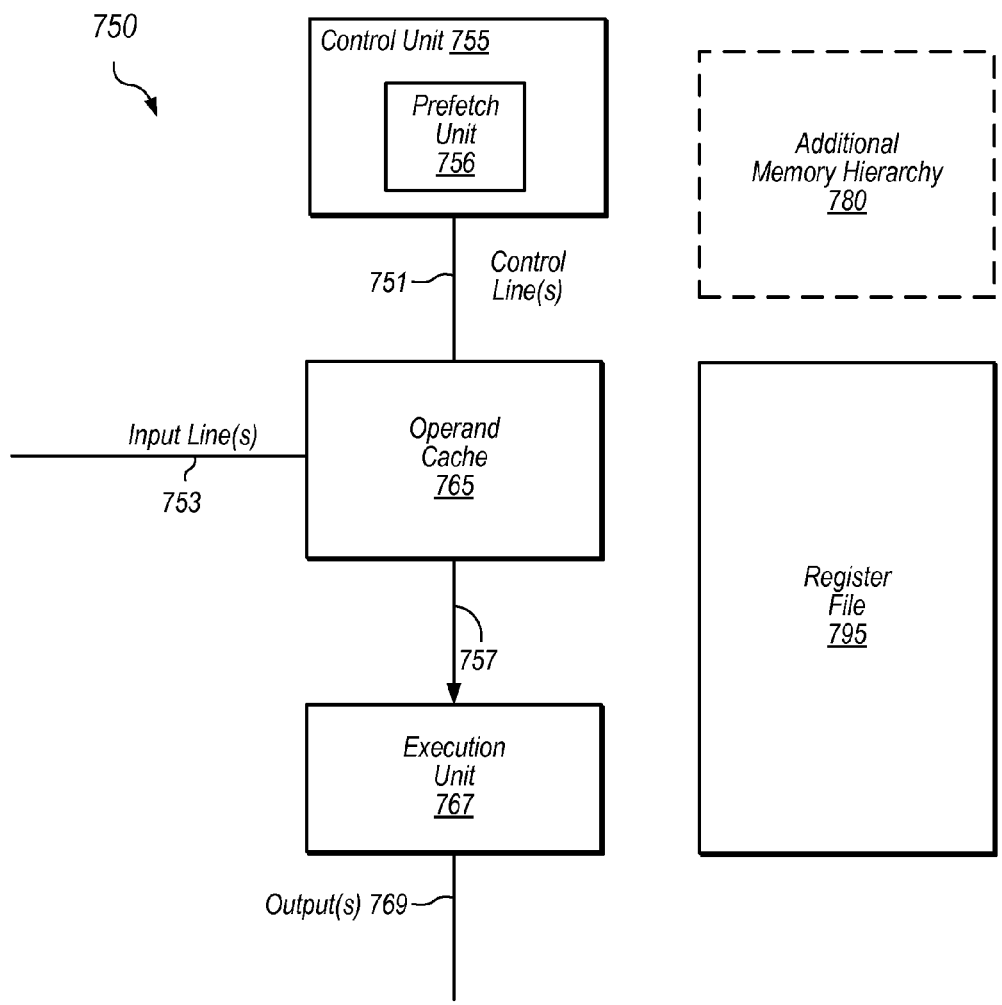
FIG. 9 is a block diagram of one embodiment of a system including a prefetch unit and an operand cache.

Turning now to FIG. 9, a block diagram 750 is shown of one embodiment of a system including a prefetch unit 756, an operand cache 765, and associated structures. In the embodiment shown, prefetch unit 756 is located within control unit 756, but may be wholly or partially located elsewhere in other embodiments. In one embodiment, prefetch unit 756 is located in a decode stage of an execution pipeline. Note that various structures, features, etc., of the embodiment of FIG. 9 may be similar to or identical to those of FIG. 2 (e.g., execution unit 767 may correspond to one or more features of execution unit 217, etc.).

Prefetch unit 756 is configured, in the embodiment shown, to cause operands to be prefetched, which may avoid delays associated with memory bank conflicts. (Memory bank conflicts may occur within register file 795, memory hierarchy 780, or another structure, for example). In one embodiment, prefetch unit 756 is configured to prefetch operands (e.g., from register file 795) based on a particular instruction using less than all of N possible source operands (where N is a positive integer, e.g., an integer greater than one).

As discussed above, for example, some instructions may require less than a maximum number of operands. Consider an instruction that simply performs a two operand "multiply" vs. an instruction that performs a three operand "multiply-add" instruction, for example. If a particular instruction (such as a two operand multiply, in one embodiment) has an unused operand slot, then it may be possible to use that operand slot to prefetch an operand for another instruction. In some embodiments, two or more operands may be prefetched by using two or more free operand slots. In such embodiments, two or more operands that are prefetched may be for different instructions (e.g., instruction A may be used to prefetch a first operand for instruction B, while also being used to prefetch second and third operands for instruction C). In some embodiments, an instruction may even be used to prefetch operands for one or more different threads or tasks.

Accordingly, in various embodiments, prefetch unit 756 is configured to prefetch one or more operands from one or more data sources. In one embodiment, prefetch unit 756 is configured to prefetch one or more operands from register file 795. In another embodiment, prefetch unit 756 is configured to prefetch one or more operands from memory hierarchy 780. An operand that is prefetched (e.g., by unit 756) may be stored in operand cache 765 in the embodiment shown until the operand is needed by another instruction that is ready to be executed. Note that prefetching may be performed wholly or partly by structures other than prefetch unit 756 in varying embodiments, and prefetched operands may also be stored in locations other than operand cache 765 (such as temporary storage elements, in one embodiment).

Thus, in some embodiments, prefetch unit 756 is configured to avoid a bank conflict by prefetching at least one of two or more source operands that are stored in a particular group (one or more) of a plurality of memory banks (e.g., the memory banks in a register file). In various embodiments, however, an operand will not necessarily always be prefetched, even if prefetch unit 756 determines that prefetching may be possible.

For example, it may be the case that only one of two possible source operands can be prefetched (e.g., due to timing concerns, etc.). In such a scenario, prefetch unit 756 may selectively determine to prefetch a first operand rather than a second operand. Selectively determining to prefetch the first operand may be based on an indication that the first operand will be used by execution unit 767 before the second operand is used. In another embodiment, selectively determining to prefetch a first operand instead of a second operand may be based on the first operand being used more often (e.g., five times vs. two times) in a given number of upcoming (yet to be executed) instructions and/or execution cycles. In general, various factors may be used to determine whether a particular operand will be prefetched from a data source such as register file 795.

In various embodiments, prefetching may not occur based on one or more other factors (that is, in some embodiments, even if an apparatus is configured to perform prefetching based on one or more first factors, the apparatus may not always prefetch an operand when those first factors are met—for example, one or more second factors may indicate that prefetching should not be performed). In other words, simply because prefetching is said to occur based on one factor does not mean that prefetching must always occur when that factor exists, in various embodiments. Accordingly, even if prefetching for a given instruction does not occur, the program will still execute correctly in various embodiments (even if it is slower due to one or more bank conflicts).

Figure 10:
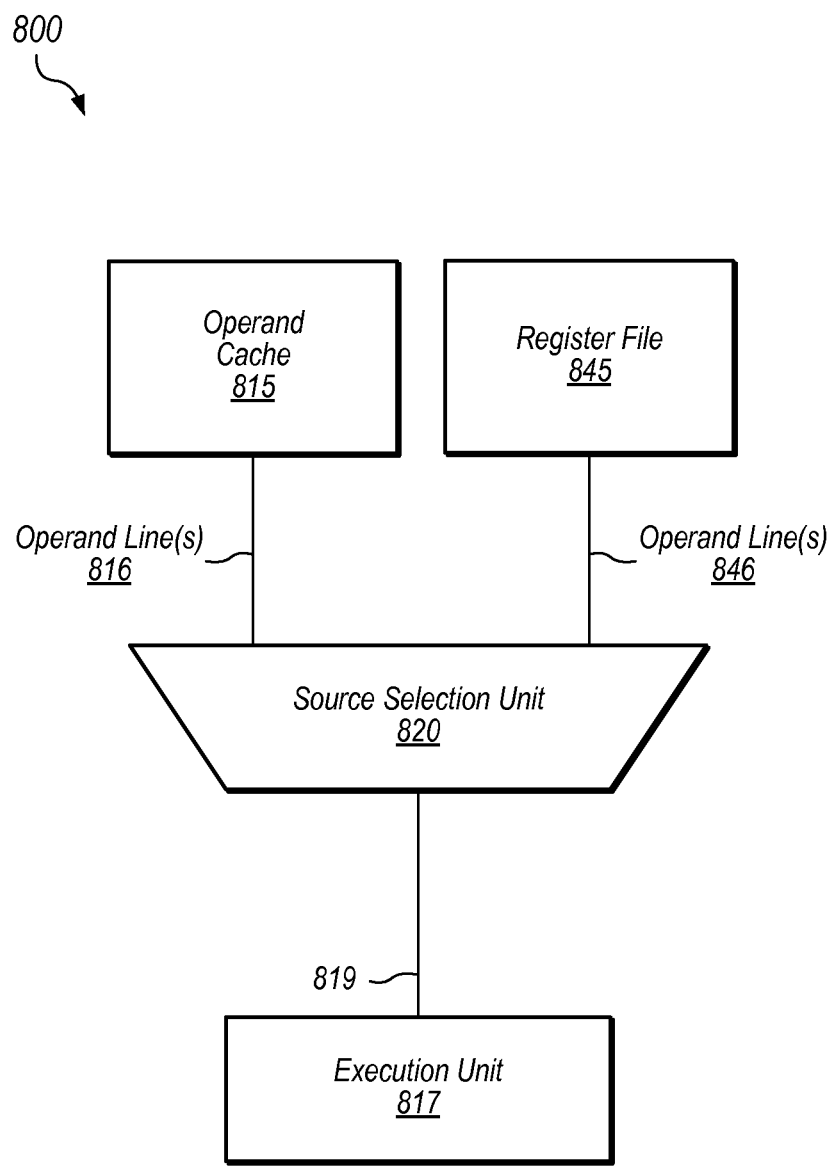
FIG. 10 is a block diagram of one embodiment of a system including an operand cache and register file, which may be used in prefetching operands in various embodiments.

Turning now to FIG. 10, a diagram 800 is shown of one embodiment of a system including operand cache 815 and register file 845. Each of operand cache 815 and register file 845 has one or more corresponding operand output lines 816 and 846. As shown, source selection unit 820 forwards operands to execution unit 817. Operands may be received, in various embodiments, by source selection unit from operand cache 815, register file 845, or elsewhere.

In some embodiments, execution unit 817 is configured to execute instructions having a greater number of possible source operands than the number of read ports that exist for register file 845. Thus, in one or more embodiments, an instruction that uses the maximum number of allowable source operands allowed by an instruction set architecture (ISA) may have to concurrently receive operands that are provided by two or more data sources, such as operand cache and register file 845. That is, in such embodiments, register file 845 may not be able to provide the maximum number of N source operands in a single read cycle. One benefit of such an arrangement, however, is that prefetching may make it possible to reduce the number of read ports for register file 845, which may reduce complexity and IC surface area for register file 845, in various embodiments.

This reduction of read ports for register file 845 may be possible due to prefetching techniques that may, in some embodiments, allow one or more operands to be stored in operand cache 815. Consider an ISA that allows up to three source operands in an embodiment in which register file 845 has only two read ports. For an instruction requiring the maximum three source operands in this embodiment, execution unit 217 may concurrently receive two operands from register file 845 and receive another (prefetched) operand from operand cache 825. That is, the fact that a prefetched operand is already located in operand cache 825 may allow an instruction to execute using only two read ports on register file 845.

Alternatively in this embodiment, if no operands can be prefetched for the instruction that requires three source operands, execution unit 217 might receive the three operands from register file 845 (or another data source) over two or more read cycles. Thus, operand lines 846 may be configured to concurrently provide less than N operands from register file 845 (where N is greater than 1), in some embodiments. Operand lines 816, on the other hand, may concurrently provide up to the maximum number of N operands in one embodiment (as it may be significantly easier in various embodiments to have a larger number of read ports on operand cache 815 due to the smaller size of operand cache 815 relative to register file 845). (In other embodiments, however, operand lines 816 may be configured to concurrently provide at least one but less than the maximum number of N operands. Further, in some embodiments, operand lines 846 may have more read ports and be configured to concurrently provide up to the maximum number of N operands).

Multi-threaded execution may be used with operand prefetching in various embodiments. For example, in one embodiment, an operand for a first thread may be prefetched using an unused source operand for an instruction in a second one of a plurality of threads. Thus, in this embodiment, if the first thread has an instruction requiring three source operands, but the second thread has an instruction that only requires two source operands, it may be possible to use the "extra" operand slot from the instruction in the second thread to prefetch one of the operands needed for the first thread's instruction. Various other prefetching permutations are possible in embodiments using multiple threads in accordance with disclosure above (e.g., using one thread to fetch instruction operands for two or more other threads, etc.).

Figure 11:
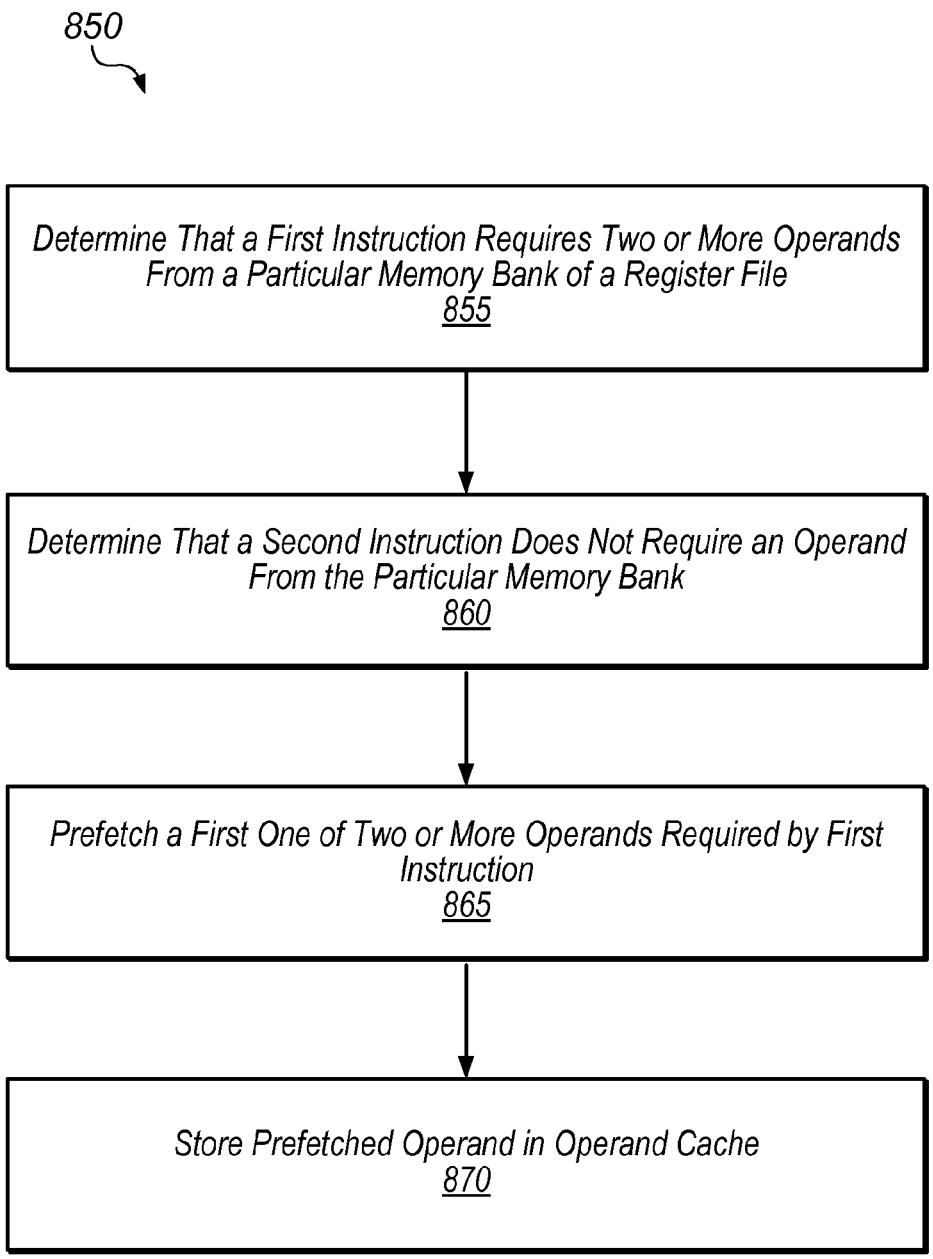
FIG. 11 is a flowchart of one embodiment of a method relating to prefetching operands.

Turning now to FIG. 11, a flowchart 850 of one embodiment of a method relating to prefetching operands is shown. In step 855, it is determined that a first instruction to be executed requires two or more source operands from a particular (same) one of a plurality of memory banks of a register file. This may represent a "bank conflict" scenario, as the register file may be configured to provide only one operand from the particular memory bank during one read cycle for the memory bank. (A "read cycle", as used herein, refers to a number of one or more clock cycles that may be required to read data from a structure, such as a register file. In some embodiments, a read cycle may be a single clock cycle, though other embodiments in which a read cycle requires two or more clock cycles are contemplated).

In step 860, it is determined that a second instruction does not require a source operand from the particular memory bank. This determination (as well as the determination in step 855) may be made in a variety of ways depending on the scheme used for storing entries in a register file, in various embodiments. In one embodiment, modulo arithmetic may be used to determine what memory bank a particular operand will be stored in. Step 855 and/or step 860 may be performed by a prefetch unit in some embodiments, but may also be performed (wholly or in part) by other structures in various embodiments.

In step 865, a first one of the two or more operands that are required by the first instruction is prefetched using the second instruction. For example, the second instruction may have an unused operand slot (and also is not going to use an operand from a memory bank and/or read port that would cause a bank conflict). Thus, the unused operand slot of the second instruction may instead be used to retrieve one of the two or more operands for the first instruction from the particular memory bank. Accordingly, in one embodiment of method 850, the second instruction occurs prior to the first instruction in program order (allowing the prefetch to occur before the first instruction needs all of its operands in order to be executed). In step 870, the prefetched operand is stored in an operand cache. Steps 865 and/or 870 may be performed (wholly or partly) by a prefetch unit in some embodiments and/or additional structures in other embodiments.

In one embodiment of method 850, a prefetch unit determines that a first instruction requires two or more operands from a particular memory bank based on information provided by a compiler. For example, in one embodiment, a compiler may provide information (as part of a preamble, or otherwise in association with an instruction) indicating which memory bank an operand will be stored in. In another embodiment, information provided by a compiler may be usable to determine what bank an operand is stored in (e.g., using modulo arithmetic).

In some embodiments, remapping information may be usable to determine that a particular instruction has an unused operand slot and/or will not require a source operand from a particular memory bank (e.g., remapping information may show that an instruction is only going to use N−1 operands instead of the maximum N operands allowable by the ISA, and/or may indicate that the instruction will not be using an operand from one or more particular memory banks.) In yet another embodiment, an instruction may be determined to have an unused operand slot based on remapping information that indicates a same operand is being used twice. For example, in one embodiment, the instruction "ADD r0, r1, r1" will use Register 1 as a source operand twice (and no other source operands). Because the same source operand is being used twice, in one or more embodiments in which operand remapping is permitted, an additional free operand slot may be available (for prefetching) by such an instruction.

Computer-Readable Medium

In various embodiments, one or more aspects of the above-described techniques and methods may be implemented as computer-readable instructions stored on any suitable computer-readable storage medium. As used herein, the term computer-readable storage medium refers to a (nontransitory, tangible) medium that is readable by a computing device or computer system, and includes magnetic, optical, and solid-state storage media such as hard drives, optical disks, DVDs, volatile or nonvolatile RAM devices, holographic storage, programmable memory, etc. The term "non-transitory" as applied to computer-readable media herein is only intended to exclude from claim scope any subject matter that is deemed to be ineligible under 35 U.S.C. §101, such as transitory (intangible) media (e.g., carrier waves), and is not intended to exclude any subject matter otherwise considered to be statutory.

Figure 12:
FIG. 12 is a block diagram of one embodiment of a computer-readable storage medium

Turning now to FIG. 12, a block diagram of one embodiment of a computer-readable medium 900 is shown. In one embodiment, computer-readable medium 900 stores instructions executable to cause a computing system to determine, based on one or more specified criteria, that a first operand of a first instruction should be stored in an operand cache. The stored instructions are also executable, in one embodiment, to cause the computing system to store a cache hint value for the first operand in an instruction stream that includes the first instruction. Thus, in one embodiment, computer-readable medium 900 may include compiler software. In other embodiments, computer-readable medium 900 may also include functionality relating to any other features described herein, as consistent with this disclosure.

System

Figure 13:
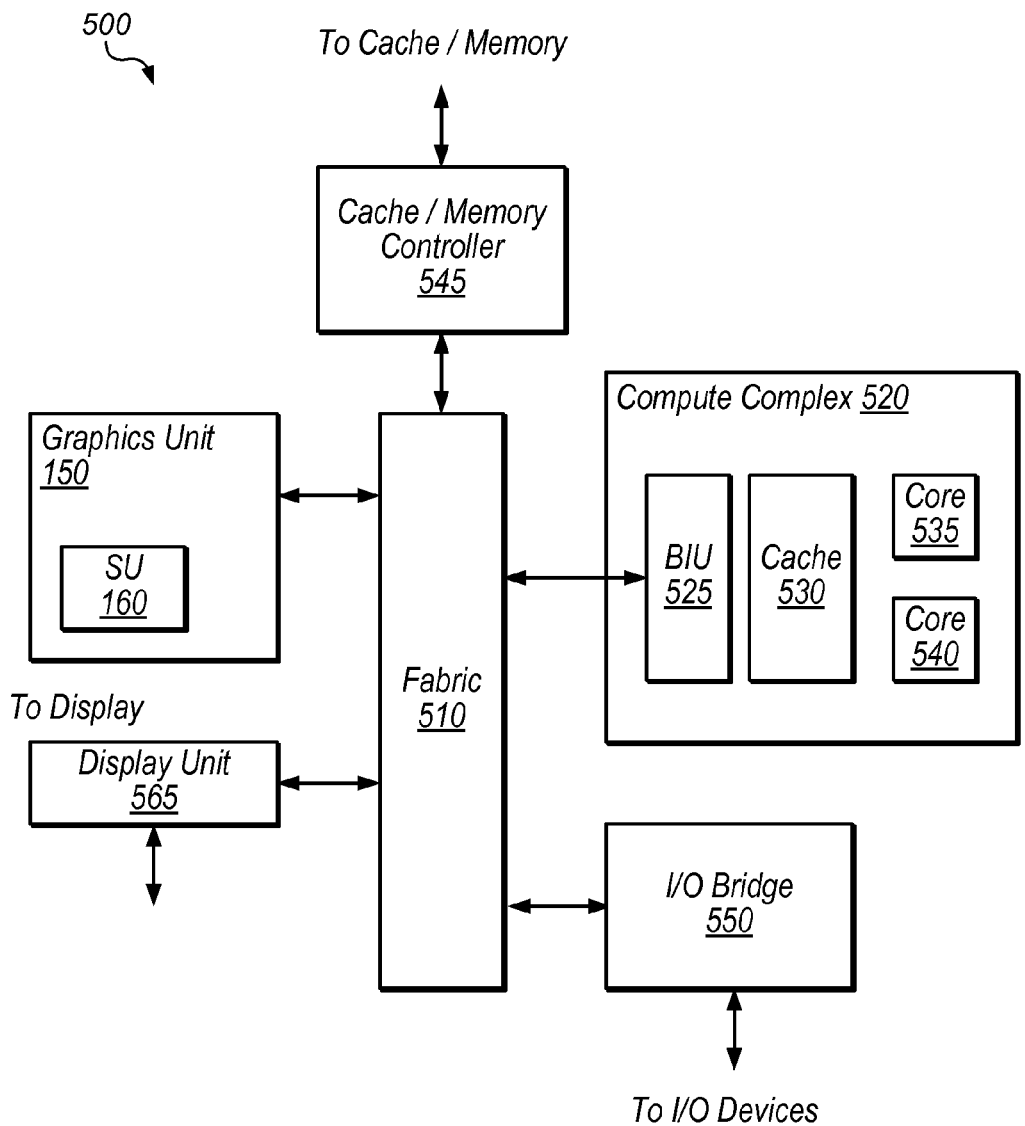
FIG. 13 is a block diagram of one embodiment of a system.

Turning now to FIG. 13, a block diagram illustrating an exemplary embodiment of a device 950 is shown. In some embodiments, elements of device 950 may be included within a system on a chip. In some embodiments, device 950 may be included in a mobile device (e.g., a mobile phone), which may be battery-powered. Therefore, power consumption by device 950 may be an important design consideration in some embodiments. In the illustrated embodiment, device 950 includes fabric 960, compute complex 970, input/output (I/O) bridge 980, cache/memory controller 955, graphics unit 150, and display unit 977.

Fabric 960 may include various interconnects, buses, MUX's, controllers, etc., and may be configured to facilitate communication between various elements of device 950. In some embodiments, portions of fabric 960 may be configured to implement various different communication protocols. In other embodiments, fabric 960 may implement a single communication protocol and elements coupled to fabric 960 may convert from the single communication protocol to other communication protocols internally.

In the illustrated embodiment, compute complex 970 includes bus interface unit (BIU) 971, cache 972, and cores 974 and 975. In various embodiments, compute complex 970 may include various numbers of cores and/or caches. For example, compute complex 970 may include 1, 2, or 4 processor cores, or any other suitable number. In one embodiment, cache 972 is a set associative L2 cache. In some embodiments, cores 974 and/or 975 may include internal instruction and/or data caches. In some embodiments, a coherency unit (not shown) in fabric 960, cache 972, or elsewhere in device 950 may be configured to maintain coherency between various caches of device 950, which may include operand caches in various embodiments. BIU 971 may be configured to manage communication between compute complex 970 and other elements of device 950. Processor cores such as cores 974 and 975 may be configured to execute instructions of a particular instruction set architecture (ISA) which may include operating system instructions and user application instructions.

Cache/memory controller 955 may be configured to manage transfer of data between fabric 960 and one or more caches and/or memories. For example, cache/memory controller 955 may be coupled to an L3 cache, which may in turn be coupled to a system memory. In other embodiments, cache/memory controller 955 may be directly coupled to a memory. In some embodiments, cache/memory controller 955 may include one or more internal caches.

As used herein, the term "coupled to" may indicate one or more connections between elements, and a coupling may include intervening elements. For example, in FIG. 5, graphics unit 150 may be described as "coupled to" a memory through fabric 510 and cache/memory controller 545. In contrast, in the illustrated embodiment of FIG. 5, graphics unit 150 is "directly coupled" to fabric 510 because there are no intervening elements.

Graphics unit 150 may be configured as described above with reference to FIG. 1, in various embodiments. Graphics unit 150 may include one or more processors and/or one or more graphics processing units (GPU's). Graphics unit 150 may receive graphics-oriented instructions, such OPENGL® or DIRECT3D® instructions, for example. Graphics unit 150 may execute specialized GPU instructions or perform other operations based on the received graphics-oriented instructions. Graphics unit 150 may generally be configured to process large blocks of data in parallel and may build images in a frame buffer for output to a display. Graphics unit 150 may include transform, lighting, triangle, and/or rendering engines in one or more graphics processing pipelines. Graphics unit 150 may output pixel information for display images. In the illustrated embodiment, graphics unit 150 includes USC 160.

Display unit 977 may be configured to read data from a frame buffer and provide a stream of pixel values for display. Display unit 977 may be configured as a display pipeline in some embodiments. Additionally, display unit 977 may be configured to blend multiple frames to produce an output frame. Further, display unit 977 may include one or more interfaces (e.g., MIPI® or embedded display port (eDP)) for coupling to a user display (e.g., a touchscreen or an external display).

I/O bridge 980 may include various elements configured to implement: universal serial bus (USB) communications, security, audio, and/or low-power always-on functionality, for example. I/O bridge 980 may also include interfaces such as pulse-width modulation (PWM), general-purpose input/output (GPIO), serial peripheral interface (SPI), and/or inter-integrated circuit (I2C), for example. Various types of peripherals and devices may be coupled to device 950 via I/O bridge 980.

In general, various hardware schemes are contemplated in different embodiments. For example, see U.S. application Ser. No. 13/956,299 ("MULTI-THREADED GPU PIPELINE"), filed Jul. 31, 2013, which is herein incorporated by reference. Structures, features, and techniques described in the '299 application may be suitably combined with structures, features, and techniques described in this disclosure (e.g., with reference to operand caches).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
    an execution unit configured to execute instructions having up to N possible source operands, wherein N is greater than 1;
    a register file configured to store a plurality of operands for instructions to be executed by the execution unit;
    an operand cache configured to store a subset of the plurality of operands stored in the register file; and fetch circuitry configured to retrieve operands specified by instructions to be executed by the execution unit, wherein the fetch circuitry, in response to a particular instruction using fewer than N source operands, is configured to prefetch one or more operands from the register file and store the one or more prefetched operands in the operand cache, and wherein the one or more operands are for an instruction other than the particular instruction.

2. The apparatus of claim 1, wherein the register file includes a plurality of memory banks coupled to a plurality of read ports, and wherein each of the plurality of read ports is configured to read from only a single respective group of one or more of the plurality of memory banks at a time.

3. The apparatus of claim 2, wherein for a given instruction having two or more source operands stored in a same group of one or more of the plurality of memory banks, the apparatus is configured to avoid a bank conflict by prefetching at least one of the two or more source operands stored in the same group of one or more of the plurality of memory banks.

4. The apparatus of claim 1, wherein the apparatus is configured to prefetch operands from one or more data sources other than the register file and the operand cache.

5. The apparatus of claim 1, wherein the apparatus further comprises a source selection unit and one or more temporary storage elements coupled between the source selection unit and the execution unit;

wherein the apparatus is configured to temporarily store one or more prefetched operands to be provided to the execution unit in the one or more temporary storage elements.

6. The apparatus of claim 1, wherein the apparatus is configured to concurrently forward a prefetched operand to the execution unit and to the operand cache.

7. The apparatus of claim 1, wherein the execution unit is configured to execute instructions having up to N possible source operands, wherein N is an integer greater than 1;

wherein the apparatus is configured to concurrently provide, to the execution unit, one or more source operands from the operand cache and a maximum of less than N source operands from data sources other than the operand cache.

8. The apparatus of claim 7, wherein the register file has less than N read ports.

9. The apparatus of claim 1, wherein the execution unit is configured to execute instructions for a plurality of threads; and wherein the apparatus is configured to prefetch operands for a first one of the plurality of threads using an unused source operand for an instruction in a second one of the plurality of threads.

10. The apparatus of claim 1, wherein the apparatus is a mobile device.

11. An apparatus, comprising:

an execution unit configured to execute instructions having up to N source operands, wherein N is greater than 1;

a register file configured to store a plurality of operands for instructions to be executed by the execution unit, wherein the register file has a particular number of read ports configured to concurrently provide up to the particular number of the operands, and wherein the particular number is smaller than N; and an operand cache configured to store a subset of the plurality of operands stored in the register file; and fetch circuitry configured to retrieve operands specified by instructions to be executed by the execution unit, wherein the fetch circuitry, in response to a particular instruction using fewer than N source operands, is configured to prefetch one or more operands from the register file and store the one or more prefetched operands in the operand cache, and wherein the one or more operands are for an instruction other than the particular instruction.

12. The apparatus of claim 11, wherein the apparatus is configured to concurrently provide up to K operands from the operand cache and up to N-K operands from the register file to the execution unit for a given instruction to be executed, wherein K is an integer equal to or greater than 1.

13. The apparatus of claim 11, further comprising a source selection unit configured to concurrently forward an operand received from the register file to the execution unit and to the operand cache.

14. The apparatus of claim 11, wherein the apparatus is configured to use the particular instruction to prefetch operands for two or more different instructions other than the particular instruction.

15. A method, comprising:

storing, by a register file of a processor, a plurality of operands for instructions to be executed by an execution unit, wherein the execution unit is configured to execute instructions having up to N possible source operands, and wherein N is greater than 1; and storing, by an operand cache of the processor, a subset of the plurality of operands stored in the register file; and in response to a particular instruction using fewer than N source operands, prefetching one or more operands from the register file and storing the one or more prefetched operands in the operand cache, wherein the one or more operands are for an instruction other than the particular instruction.

16. The method of claim 15, wherein the register file includes a plurality of memory banks coupled to a plurality of read ports, and wherein each of the plurality of read ports is configured to read from only a single respective group of one or more of the plurality of memory banks at a time.

17. The method of claim 15, wherein the processor is configured to concurrently forward a prefetched operand to the execution unit and to the operand cache.

18. The method of claim 15, wherein the execution unit is configured to execute instructions for a plurality of threads; and wherein the processor is configured to prefetch operands for a first one of the plurality of threads using an unused source operand for an instruction in a second one of the plurality of threads.

19. The apparatus of claim 1, further comprising an execution pipeline that includes the execution unit, the register file, the operand cache, and the fetch circuitry.

* * * * *